(12) United States Patent
Yu

(10) Patent No.: US 12,055,509 B2
(45) Date of Patent: Aug. 6, 2024

(54) METHOD FOR DETECTING PARTICLES

(71) Applicant: TAIWAN SEMICONDUCTOR MANUFACTURING COMPANY LTD., Hsinchu (TW)

(72) Inventor: Chwen Yu, Taipei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/811,891

(22) Filed: Jul. 12, 2022

(65) Prior Publication Data

US 2022/0341865 A1 Oct. 27, 2022

Related U.S. Application Data

(62) Division of application No. 16/785,275, filed on Feb. 7, 2020, now Pat. No. 11,674,919.

(60) Provisional application No. 62/875,175, filed on Jul. 17, 2019.

(51) Int. Cl.
*G01N 27/22* (2006.01)
*G01N 15/06* (2024.01)

(52) U.S. Cl.
CPC ....... *G01N 27/221* (2013.01); *G01N 15/0656* (2013.01)

(58) Field of Classification Search
CPC .......................... G01N 27/221; G01N 15/0656
See application file for complete search history.

(56) References Cited

U.S. PATENT DOCUMENTS

| | | | |
|---|---|---|---|
| 6,509,745 B1 * | 1/2003 | Marszalek | G01N 27/228 324/698 |
| 2003/0121313 A1 | 7/2003 | Sparks | |
| 2004/0130339 A1 | 7/2004 | Su et al. | |
| 2011/0144851 A1 * | 6/2011 | Gremminger | G01N 33/2888 701/31.4 |
| 2012/0325664 A1 | 12/2012 | Shim et al. | |
| 2013/0334619 A1 | 12/2013 | Merz et al. | |

FOREIGN PATENT DOCUMENTS

| | | | | |
|---|---|---|---|---|
| CA | 2833239 A1 * | 10/2012 | | G01F 23/284 |
| CN | 101266941 A | 9/2008 | | |
| CN | 101382534 A * | 3/2009 | | G01F 23/265 |
| CN | 102538869 A | 7/2012 | | |

(Continued)

OTHER PUBLICATIONS

English Abstract of KR20170114043A.
(Continued)

*Primary Examiner* — Feba Pothen
(74) *Attorney, Agent, or Firm* — WPAT LAW; Anthony King

(57) ABSTRACT

A method for detecting particles in a liquid includes following operations. A detection device is provided. A chemical liquid is provided to flow through the detection device. A capacitance of the detection device is measured during the flowing of the chemical liquid. A dielectric constant of the chemical liquid is calculated according to the capacitance of the detection device. When the dielectric constant of the chemical liquid is between an upper limit and a lower limit, the chemical liquid is determined to be normal.

20 Claims, 18 Drawing Sheets

(56) References Cited

FOREIGN PATENT DOCUMENTS

| CN | 107132257 A | 9/2017 |
|---|---|---|
| CN | 109211994 A | 1/2019 |
| JP | 2005311341 A | 11/2005 |
| JP | 2011003817 A | 1/2011 |
| KR | 20170114043 A | 10/2017 |
| TW | 201604527 A | 2/2016 |

OTHER PUBLICATIONS

English Abstract Translation of CN 102538869 A.
U.S. Pat. No. 10,533,934 is the US counterpart of TW 201604527.
U.S. Pat. No. 7,563,719 is the US counterpart of CN101266941.
English Abstract Translation of JP 2011003817 A.
U.S. Appl. No. 11/105,765 B2 is the US counterpart of CN 109211994 A.
English Abstract Translation of CN 107132257 A.
English Abstract Translation of JP 2005311341 A.

\* cited by examiner

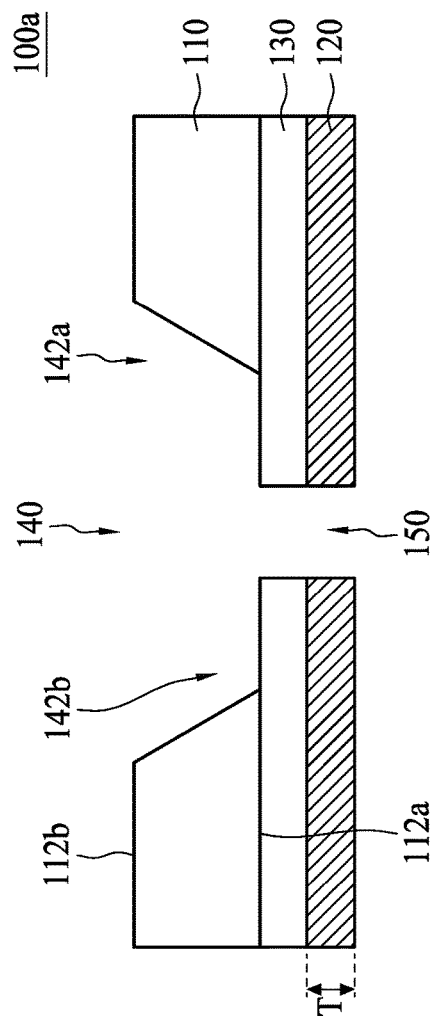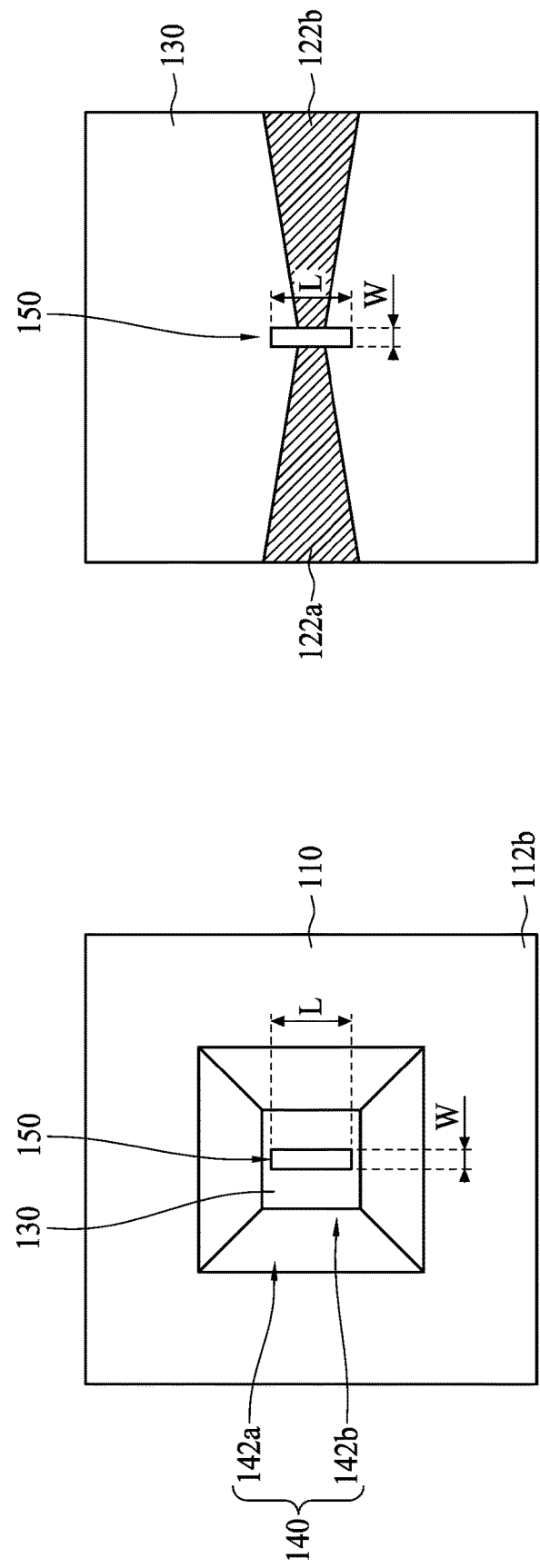
FIG. 1A
FIG. 1B
FIG. 1C

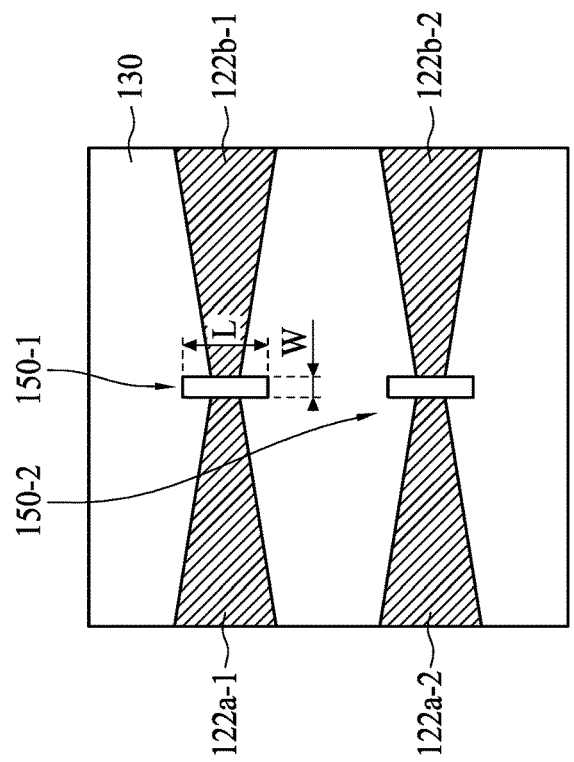
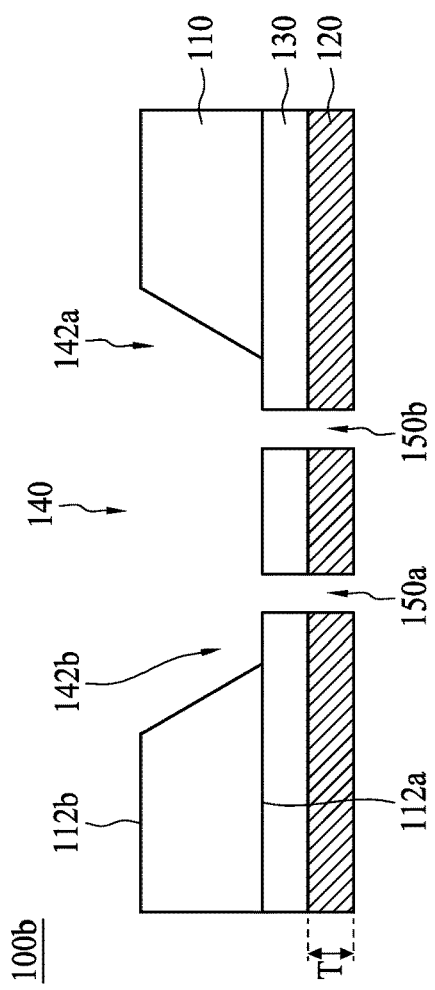
FIG. 2B
FIG. 2A

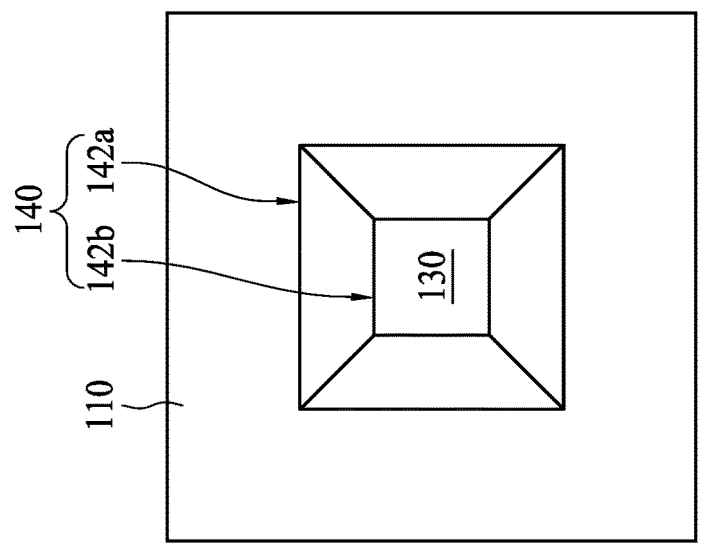
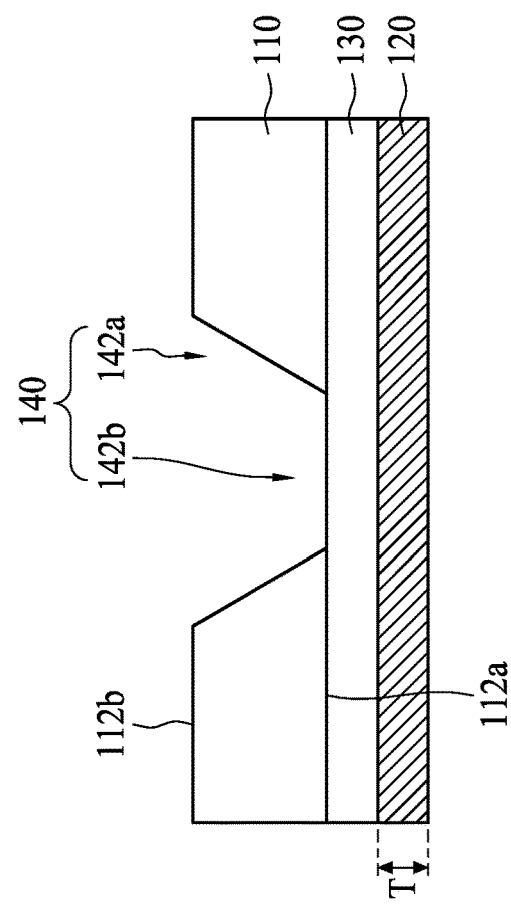
FIG. 7B
FIG. 7A

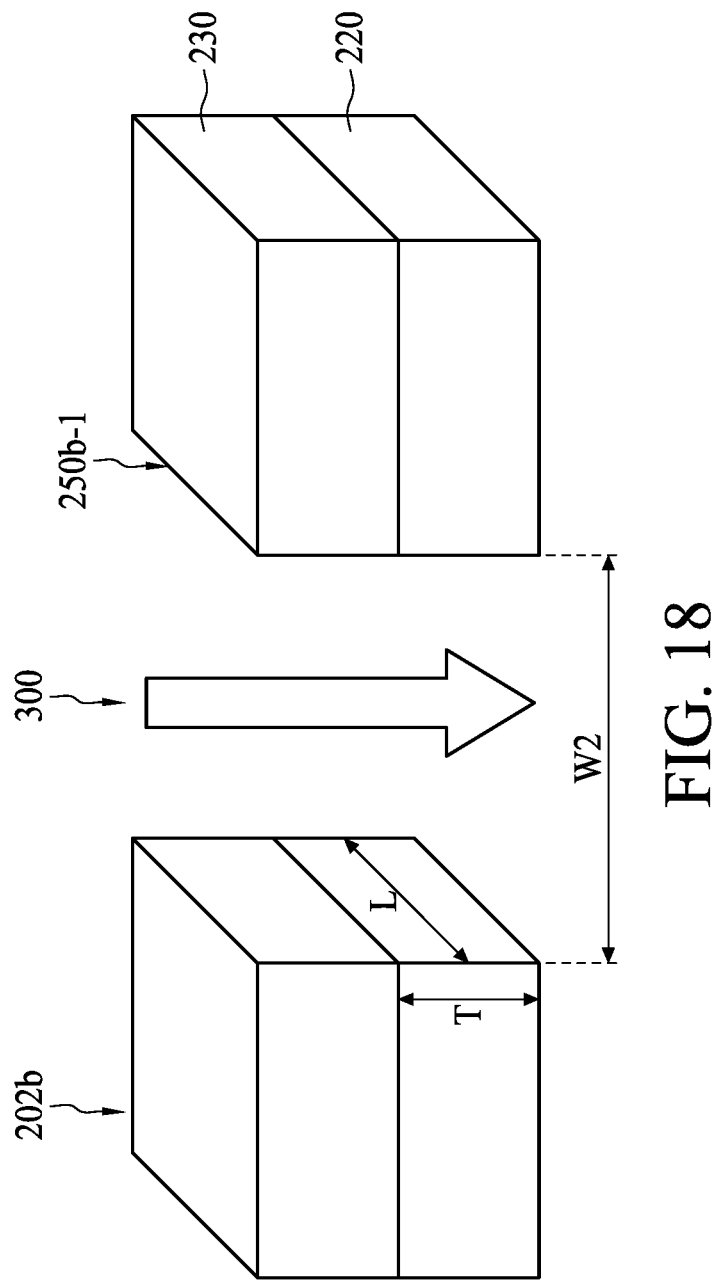

METHOD FOR DETECTING PARTICLES

PRIORITY DATA

This patent is a divisional application of U.S. patent application Ser. No. 16/785,275 filed on Feb. 7, 2020, entitled of "DETECTOR, DETECTION DEVICE AND METHOD OF USING THE SAME", which claims the benefit of U.S. Provisional Patent Application Ser. No. 62/875,175 filed Jul. 17, 2019, the entire disclosure of which is hereby incorporated by reference.

BACKGROUND

In the fabrication of semiconductor integrated circuit (IC) devices, various device features such as insulating layers, conductive layers, semiconductive layers, etc., are formed on a semiconductor substrate. It is well known that the processes in which these features are formed are factors in quality of a fabricated IC device. In addition, the quality of the fabricated device and the cleanliness of the manufacturing environment in which the IC device is processed are, in turn, factors in the yield of an IC fabrication process.

The ever-increasing trend of miniaturization of semiconductor IC devices in recent years requires more stringent control of the cleanliness in the fabrication process and in the processing chamber where the process is conducted. This includes more stringent control of the maximum amount of impurities and contaminants that are allowed in a process chamber. When the dimension of a miniaturized device approaches the sub-half-micron level, even a minutest amount of contaminants can significantly reduce the yield of the IC manufacturing process. For instance, the number of particles in a chemical liquid used in the process may raise a yield issue. Further, without on-line particle detection, it is difficult to identify whether the particles come from raw material or from transportation before production processes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A is a cross-sectional view illustrating a detector according to aspects of the present disclosure, FIG. 1B is a top view of the detector in FIG. 1A, and FIG. 1C is a bottom view of the detector in FIG. 1A.

FIG. 2A is a cross-sectional view illustrating a detector according to aspects of the present disclosure, and FIG. 2B is a bottom view of the detector of FIG. 2A.

FIG. 7A is a cross-sectional view of a detector illustrating a stage of a method for forming the detection device according to aspects of the present disclosure, and FIG. 7B is a top view of the detector in FIG. 7A.

FIG. 18 is a schematic drawing illustrating a portion of the detection device in some embodiments of the method for detecting particles in a chemical liquid according to aspects of the present disclosure.

DETAILED DESCRIPTION

Figure 3:
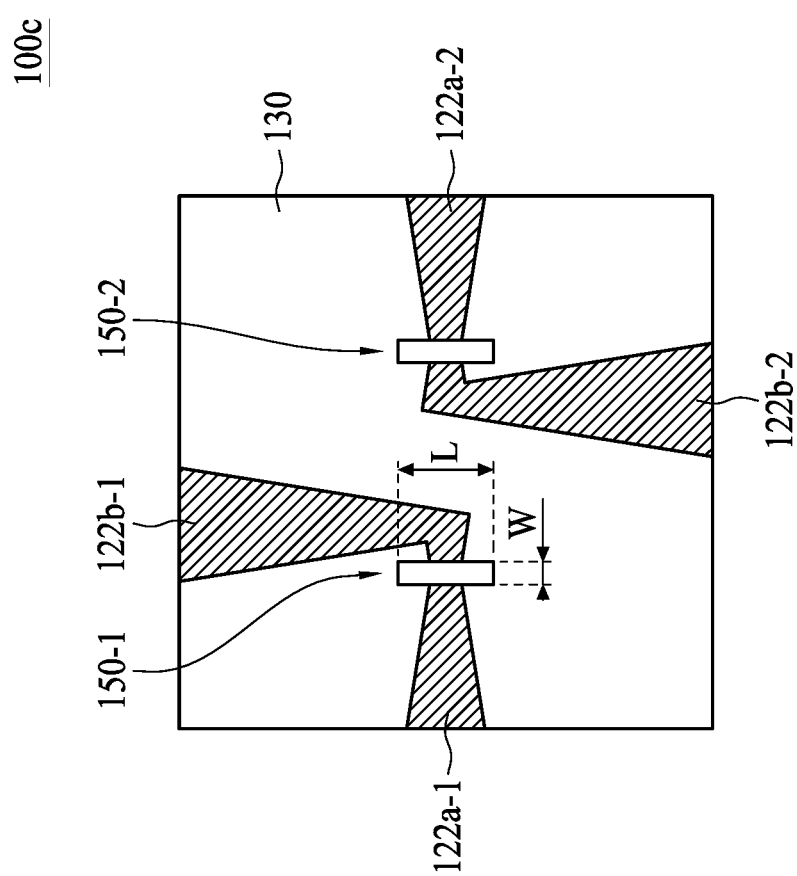
FIG. 3 is a bottom view illustrating a detector according to aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the embodiments. Accordingly, the disclosure expressly should not be limited to such embodiments illustrating some possible non-limiting combination of features that may exist alone or in other combinations of features the scope of the disclosure being defined by the claims appended hereto.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

The term "nanoparticles" refers to atomic, molecular or macromolecular particles typically in the length scale of approximately 1 to 100 nanometer range. Typically, the novel and differentiating properties and functions of nanoparticles are observed or developed at a critical length scale of matter typically under 100 nm.

Particles, such as nanoparticles distributed in a chemical liquid may alter characteristics of such chemical liquid. Sometimes, the characteristics of such chemical liquid can be adjusted by introducing conductive or insulating nanoparticles. However, the particles or the nanoparticles may be unwanted and such nanoparticle contamination can result in electrical, yield and device performance degradation. A detector for obtaining the characteristics of chemical liquid or for detecting the nanoparticles distributed in a chemical liquid is therefore needed.

Nanoparticle detectors are therefore developed. In some comparative approaches, the nanoparticle detector is used mainly for conductive liquid. The term "conductive liquid" is referred to as a chemical liquid having a resistivity less than approximately milliohm centimeters (MΩcm). It is found that such nanoparticle detectors do not perform accurate detection for chemical liquids having resistivity greater than milliohm centimeters. In some comparative approaches, the nanoparticle detectors can be used to detect for high-density nanoparticles. In some instances, the term "high-density" refers to an amount greater than approximately 1000 per cubic centimeter. However, it has been found that such nanoparticle detector suffers from failure when the nanoparticle density is less than 1000 per cubic centimeter. In some comparative approaches, the detector can be a laser photo detector (UDI). However, UDI suffered from low efficiency when detecting particles having a size equal to or less than 20 nm.

The present disclosure provides a detection device and method for using the same. In some embodiments, the detection device is able to detect nanoparticles in a chemical liquid having a resistivity greater than milliohm centimeters. In some embodiments, the detection device includes a nano-capacitor. When the chemical liquid flows through the nano-capacitor, a capacitance may be changed. According to the change in the capacitance of the nano-capacitor, a presence of the nanoparticles can be determined. Further, a characteristic of the chemical liquid can be obtained. The detecting approach is dependent on different material own its different dielectric constant.

FIG. 1A is a cross-sectional view illustrating a detector according to aspects of the present disclosure, FIG. 1B is a top view of the detector in FIG. 1A and FIG. 1C is a bottom view of the detector in FIG. 1A. In some embodiments, a detector 100a is provided. The detection device 100 includes a substrate 110, a conductive layer 120 below the substrate 110 and an insulating layer 130 between the conductive layer 120 and the substrate 110. The substrate 110 includes a first surface 112a and a second surface 112b opposite to the first surface 112a. The conductive layer 120 is disposed below the first surface 112a of the substrate 110, and the insulating layer 130 is disposed between the conductive layer 120 and the first surface 112a of the substrate 110.

The substrate 110 can be a semiconductor substrate that is commonly used in semiconductor manufacturing processes, but the disclosure is not limited thereto. In some embodiment, the semiconductor substrate can be an intrinsic semiconductor substrate, but the disclosure is not limited thereto. In some embodiments, the conductive layer 120 can include a metal layer. In other embodiments, the conductive layer 120 can include a doped semiconductor layer such as a doped polysilicon layer, but the disclosure is not limited thereto. In some embodiments, a thickness T of the conductive layer 120 can be between approximately 1 μm and approximately 10 μm. In other embodiments, the thickness T of the conductive layer 120 can be between approximately 100 nm and approximately 1 μm. The conductive layer 120 having different thickness ranges can be used in different detections, as will be described in the following description. In some embodiments, the insulating layer 130 includes a silicon nitride layer, but the disclosure is not limited thereto. The insulating layer 130 provides sufficient chemical resistance, mechanical strength and pressure resistance such that the insulating layer 130 can serve as a supporting layer for the conductive layer 120. In some embodiments, a thickness of the insulating layer 130 is between approximately 10 nm and approximately 500 nm in order to provide sufficient support, but the disclosure is not limited thereto. Further, the conductive layer 120 has a pattern, and the insulating layer 130 is exposed through the pattern of the conductive layer 120, as shown in FIG. 1C. In some embodiment, the pattern of the conductive layer 120 includes a first portion 122a and a second portion 122*b*. In some embodiments, the first portion 122*a* and the second portion 122*b* may be aligned with each other. In other embodiments, the first portion 122*a* and the second potion 122*b* may be arranged symmetrically, but the disclosure is not limited thereto. As shown in FIG. 1C, the first portion 122*a* and the second portion 122*b* are separated from each other.

As shown in FIGS. 1A and 1B, the detector 100*a* has a funnel-shaped recess 140 extending from the second surface 112*b* of the substrate 110 to the first surface 112*a* of the substrate 110, such that the insulating layer 130 may be exposed through the bottom of the funnel-shaped recess 140. As shown in FIG. 1B, the funnel-shaped recess 140 can have a rectangular configuration as viewed from above, but the disclosure is not limited thereto. In other embodiments, the funnel-shaped recess 140 can have a circular configuration or other suitable configurations as viewed from above. The funnel-shaped recess 140 has an upper opening 142*a* at the second surface 112*b* and a lower opening 142*b* at the first surface 112*a*. Further, a width, a length or a diameter of the upper opening 142*a* is greater than a width, a length or a diameter of the lower opening 142*b*, as shown in FIG. 1A. As shown in FIGS. 1A to 1C, the detector 100*a* further has a through via 150 extending through the conductive layer 120 and the insulating layer 130. The through via 150 is coupled to the funnel-shaped recess 140. The through via 150 can have a rectangular configuration as viewed from above or as viewed from below, but the disclosure is not limited thereto. Further, the through via 150 separates the first portion 122*a* and the second portion 122*b* of the conductive layer 120, as shown in FIG. 1C. The through via 150 may have a width W and a length L. In some embodiments, both of the width W and the length L are less than a width, a length or a diameter of the lower opening 142*b*, In some embodiments, the length L of the through via 150 is greater than a width of the pattern of the conductive layer 120 such that the first portion 122*a* and the second portion 122*b* are entirely separated from each other by the through via 150. In some embodiments, the width W of the through via 150 is less than or equal to approximately 100 nm, but the disclosure is not limited thereto. In some embodiments, the length L of the through via 150 is between approximately 100 µm and approximately 1000 µm. In other embodiments, the length L of the through via 150 is between approximately 1 µm and approximately 10 µm. It should be noted that the larger through via 150 is paired with the thicker conductive layer 120. For example, when the length L of the through via 150 is between approximately 100 µm and approximately 1000 µm, the thickness T of the conductive layer 120 is between approximately 1 µm and approximately 10 µm. When the length L of the through via 150 is between approximately 1 µm and approximately 10 µm, the thickness of the conductive layer 120 can be between approximately 100 nm and approximately 1 µm. The through vias 150 with different lengths L can be used in different detections, as will be described in the following description.

FIG. 2A is a cross-sectional view illustrating a detector according to aspects of the present disclosure, and FIG. 2B is a bottom view of the detector in FIG. 2A. It should be noted that same elements in FIGS. 1A to 1C and 2A to 2B are indicated by the same numerals, and details of the same elements shown in FIGS. 1A to 1C and 2A to 2B are omitted in the description of FIGS. 2A and 2B for brevity. In some embodiments, a detector 100*b* is provided. The detector 100*b* includes a substrate 110, a conductive layer 120 and an insulating layer 130 between the substrate 110 and the conductive layer 120. The substrate 110 has a first surface 112*a* and a second surface 112*b* opposite to the first surface 112*a* and the insulating layer 130 is in contact with the first surface 112*a*. As mentioned above, the conductive layer 120 has a pattern, and the insulating layer 130 is exposed through the pattern of the conductive layer 120. The detector 100*b* further includes a funnel-shaped recess 140 extending from the second surface 112*b* to the first surface 112*a*. As mentioned above, the funnel-shaped recess 140 has an upper opening 142*a* at the second surface 112*b* and a lower opening 142*b* at the first surface 112*a*, and a width of the upper opening 142*a* is greater than a width of the lower opening 142*b*.

The detector 100*b* further includes a plurality of through vias 150-1 and 150-2 to 150*n* extending through the conductive layer 120 and the insulating layer 130. For example, there can be two through vias 150-1 and 150-2, as shown in FIGS. 2A and 2B. The through vias 150-1 and 150-2 are both coupled to the funnel-shaped recess 140 but separated from each other. It should be noted that the above-mentioned pattern of the conductive layer 120 is formed corresponding to the through vias. For example, when there are two through vias 150-1 and 150-2, the pattern of the conductive layer 120 may have a first portion 122*a*-1 and a second portion 122*b*-1 formed corresponding to the through via 150-1, and the pattern of the conductive layer 120 may further have a first portion 122*a*-2 and a second portion 122*b*-2 formed corresponding to the through via 150-2. Further, the first portion 122*a*-1 and the second portion 122*b*-1 are separated from each other by the through via 150-1, and the first portion 122*a*-2 and the second portion 122*b*-2 are separated from each other by the through via 150-2, as shown in FIG. 2B.

Still referring to FIGS. 2A and 2B, the funnel-shaped recess 140 can have a rectangular configuration as viewed from above, but the disclosure is not limited thereto. In other embodiments, the funnel-shaped recess 140 can have a circular configuration or other suitable configurations as viewed from above. The through vias 150-1 and 150-2 respectively can have a rectangular configuration as viewed from above or as viewed from below, but the disclosure is not limited thereto. Each of the through vias 150-1 and 150-2 may have a width W and a length L. In some embodiments, both of the width W and the length L are less than a width, a length or a diameter of the lower opening 142*b* of the funnel-shaped recess 140. In some embodiments, the length of the through vias 150-1 and 150-2 is greater than a width of the pattern of the conductive layer 120, such that the first portion 122*a*-1 and the second portion 122*b*-1 are entirely separated from each other by the through via 150-1 and the first portion 122*a*-2 and the second portion 122*b*-2 are entirely separated from each other by the through via 150-2. In some embodiments, the width W of the through via 150 is less than or equal to approximately 100 nm, but the disclosure is not limited thereto. In other embodiments, the length L of the through via 150 is between approximately 1 µm and approximately 10 µm. It should be noted that the smaller through via 150 is paired with the thinner conductive layer 120, and the larger through via is paired with the thicker conductive layer 120. For example, when the length L of each through vias 150-1 and 150-2 is between approximately 1 µm and approximately 10 µm, the thickness T of the conductive layer 120 can be between approximately 100 nm and approximately 1 µm. The different thickness ranges can be used in different detections, as will be described in the following description.

FIG. 3 is a bottom view illustrating a detection device according to aspects of the present disclosure. It should be noted that same elements in FIGS. 2A, 2B and 3 are indicated by the same numerals, and details of the same elements shown in FIGS. 2A, 2B and 3 are omitted in the description of FIG. 3 for brevity. As shown in FIG. 3, a detector 100c is provided. The detection device 110c may include elements similar to those described above, and thus only the differences are detailed. In some embodiments, the first portions and the second portions of the pattern are not aligned with each other. As shown in FIG. 3, in some embodiments, the first portion 122a-1 and the second portion 122b-1 are perpendicular to each other, and are separated from each other by the through via 150-1. The first portion 122a-2 and the second portion 122b-2 are perpendicular to each other, and are separated from each other by the through via 150-2. It should be noted that in some embodiments, the first portions 122a-1 and 122a-2 can be parallel to each other, and the second portions 122b-1 and 122b-2 can be parallel to each other, but the disclosure is not limited thereto. It should be understood that the first portions 122a-1, 122a-2 and the second portions 122b-1, 122b-2 of the pattern can be arranged depending on different product designs, and such details are omitted in the interest of brevity. In some embodiments, the through via 150-1 and the length of the through via 150-2 are parallel with each other, as shown in FIG. 3.

Figure 4:
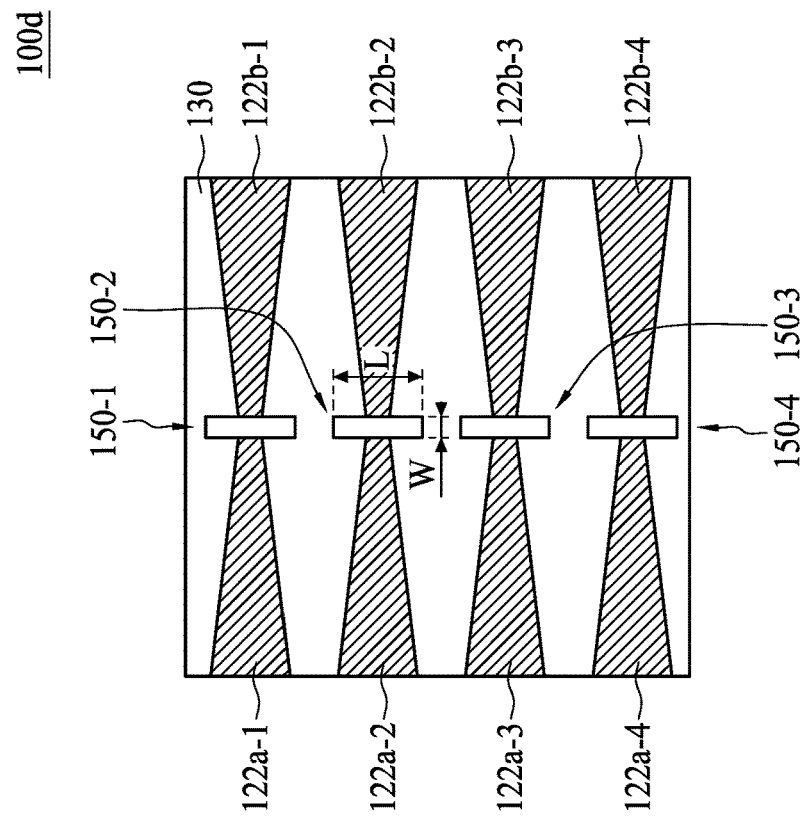
FIG. 4 is a bottom view illustrating a detector according to aspects of the present disclosure.

FIG. 4 is a bottom view illustrating a detection device according to aspects of the present disclosure. It should be noted that same elements in FIGS. 2A, 2B and 4 are indicated by the same numerals, and details of the same elements shown in FIGS. 2A, 2B and 4 are omitted in the description of FIG. 4 for brevity. As shown in FIG. 4, a detector 100d is provided. The detection device method may include elements similar to those described above, and thus only the differences are detailed. As mentioned above, the detector 100d can include a plurality of through vias 150-1 and 150-2 to 150-n extending through the conductive layer 120 an the insulating layer 130. For example, there are four through vias 150-1, 150-2, 150-3 and 150-1 in some embodiments. The through vias 150-1, 150-2, 150-3 and 150-4 are all coupled to the funnel-shaped recess 140, but are separated from each other as shown in FIG. 4. Additionally, the through vias 150-1, 150-2, 150-3 and 150-4 can be aligned with each other to form a straight line, but the disclosure is not limited thereto.

Still referring to FIG. 4, as mentioned above, the pattern of the conductive layer 120 is formed corresponding to the through vias 150-1, 150-2, 150-3 and 150-4. For example, when there are four through vias 150-1, 150-2, 150-3 and 150-4, the pattern of the conductive layer 120 may have a first portion 122a-1 and a second portion 122b-1 formed corresponding to the through via 150-1, a first portion 122a-2 and a second portion 122b-2 formed corresponding to the through via 150-2, a first portion 122a-3 and a second portion 122b-3 formed corresponding to the through via 150-3, and a first portion 122a-4 and a second portion 122b-4 formed corresponding to the through via 150-4. Further, the first portion 122a-1 and the second portion 122b-1 are separated from each other by the via 150-1, the first portion 122a-2 and the second portion 122b-2 are separated from each other by the through via 150-2, the first portion 122a-3 and the second portion 122b-3 are separated from each other by the through via 150-3, and the first portion 122a-4 and the second portion 122b-4 are separated from each other by the through via 150-4, as shown in FIG. 4. In some embodiments, all of the first portions 122a-1 to 122a-4 and the second portions 122b-1 to 122b-4 are separated from each other. In some embodiments, the first portion 122a-1 is aligned with the second portion 122b-1, the first portion 122a-2 is aligned with the second portion 122b-2, the first portion 122a-3 is aligned with the second portion 122b-3, and the first portion 122a-4 is aligned with the second portion 122b-4, but the disclosure is not limited thereto. In some embodiments, the first portions (i.e., 122a-1 to 122a-4) and the second portions (i.e., 122b-1 to 122b-4) are arranged symmetrically, but the disclosure is not limited thereto. It should be understood that the first portions (i.e., 122a-1 to 122a-4) and the second portions (i.e., 122b-1 to 122b-4) of the pattern can be arranged depending on different product designs, and those details are omitted for brevity.

Figure 5:
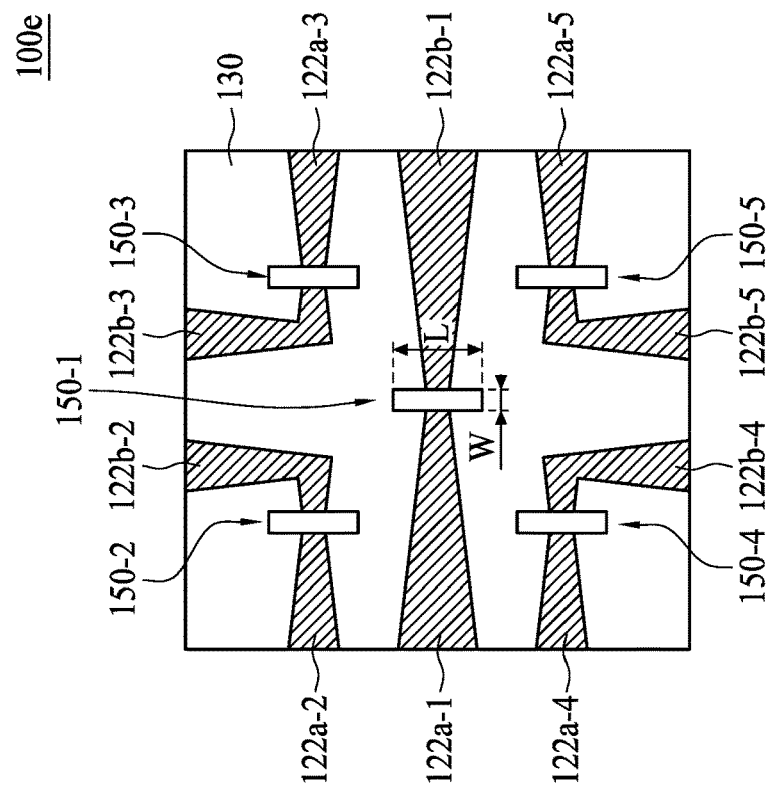
FIG. 5 is a bottom view illustrating a detector according to aspects of the present disclosure.

FIG. 5 is a bottom view illustrating a detection device according to aspects of the present disclosure. It should be noted that same elements in FIGS. 2A, 2B and 5 are indicated by the same numerals, and details of the same elements shown in FIGS. 2A, 2B and 5 are omitted in the description of FIG. 5 for brevity. As shown in FIG. 5, a detector 100e is provided. The detection device 110e may include elements similar to those described above, and thus only the differences are detailed. As mentioned above, the detector 100e can include a plurality of through vias 150-1 and 150-2 to 150-n extending through the conductive layer 120 and the insulating layer 130. For example, there are five through vias 150-1, 150-2, 150-3, 150-4 and 150-5 in some embodiments. The through vias 150-1, 150-2, 150-3, 150-4 and 150-5 are all coupled to the funnel-shaped recess 140, but are separated from each other as shown in FIG. 5. In some embodiments, the through vias 150-1, 150-2, 150-3, 150-4 and 150-5 can be aligned with each other to form a straight line, but the disclosure is not limited thereto. In other embodiments, the through vias 150-1, 150-2, 150-3, 150-4 and 150-5 can be arranged dependent on different product designs. For example, the through vias 150-1, 150-2, 150-3 150-4 and 150-5 can be arranged to form a quincunx, as shown in FIG. 5, but the disclosure is not limited thereto.

Still referring to FIG. 5, as mentioned above, the pattern of the conductive layer 120 is formed corresponding to the through vias 150-1, 150-2, 150-3, 150-4 and 150-5. For example, when there are five through vias 150-1, 150-2, 150-3, 150-4 and 150-5, the pattern of the conductive layer 120 may have a first portion 122a-1 and a second portion 122b-1 formed corresponding to the through via 150-1, a first portion 122a-2 and a second portion 122b-2 formed corresponding to the through via 150-2, a first portion 122a-3 and a second portion 122b-3 formed corresponding to the through via 150-3, a first portion 122a-4 and a second portion 122b-4 formed corresponding to the through via 150-4, and a first portion 122a-5 and a second portion 122b-5 formed corresponding to the through via 150-5. Further, the first portion 122a-1 and the second portion 122b-1 are separated from each other by the through via 150-1, the first portion 122a-2 and the second portion 122b-2 are separated from each other by the through via 150-2, the first portion 122a-3 and the second portion 122b-3 are separated from each other by the through via 150-3, the first portion 122a-4 and the second portion 122b-4 are separated from each other by the through via 150-4, and the first portion 122a-5 and the second portion 122b-5 are separated from each other by the through via 150-5 as shown in FIG. 5. In some embodiments, the first portions 122a-1 to 122a-5 and the second portions 122b-1 to 122b-5 are separated from each other. Further, the arrangement of the first portions 122a-1 to 122a-5 and the second portions 122b-1 to 122b-5 can be modified depending on different product designs.

Figure 6B:
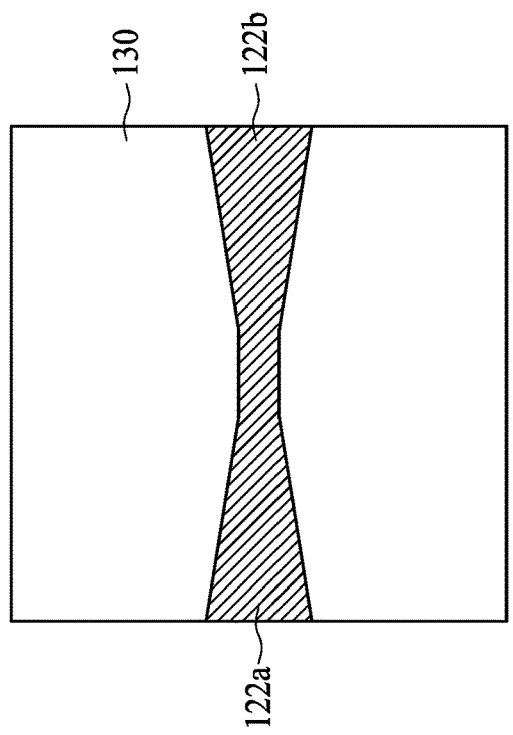
FIG. 6B is a bottom view of the detector in FIG. 6A.
Figure 6A:
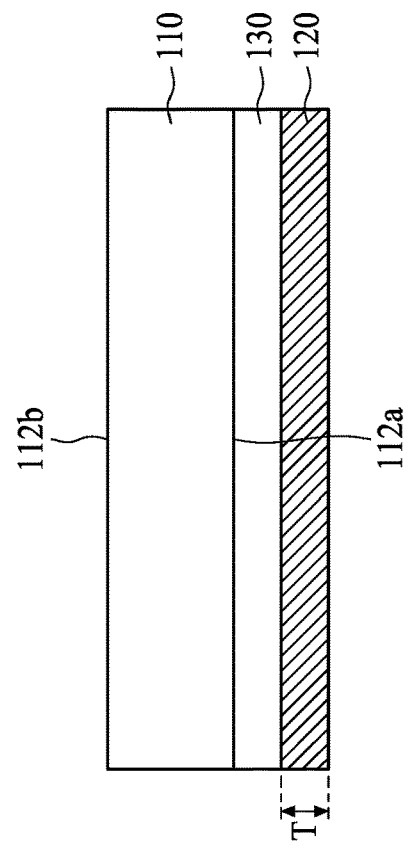
FIG. 6A is a cross-sectional view of a detector illustrating a stage of a method for forming a detection device according to aspects of the present disclosure.

FIG. 6A is a cross-sectional view of a detector illustrating a stage of a method for forming the detector according to aspects of the present disclosure, and FIG. 6B is a bottom view of the detector in FIG. 6A. The detector 100a, 100b, 100c, 100d or 100e can be formed by suitable operations, therefore the following described details are provided as an example, but the disclosure is not limited thereto. Further, same elements in the aforementioned drawings and FIGS. 6A and 6B can include similar materials and be indicated by the same numerals, and therefore such details are omitted. In some embodiments, a substrate 110 can be provided. As shown in FIG. 6A, the substrate 110 can include a first surface 112a and a second surface 112b opposite to the first surface 112a. An insulating layer 130 is formed on the first surface 112a of the substrate 110. A conductive layer 120 can be formed on the insulating layer 130. Accordingly, the insulating layer 130 is disposed between the substrate 110 and the conductive layer 120. A thickness T of the conductive layer 120 is determined according to the length L of the through via to be formed. The relationship between the thickness T of the conductive layer 120 and the length L of the through via to be formed has been described above; therefore, such details are omitted for brevity. The conductive layer 120 is patterned to form a first portion 122a and a second portion 122b coupled to each other, as shown in FIG. 6B. The first portion 122a and the second portion 122b form a pattern, and the insulating layer 130 is exposed through the pattern. In some embodiments, the pattern is formed according to a quantity of through vias to be subsequently formed. For example, when there is one through via to be formed, the pattern is formed to have one first portion 122a and one second portion 122b. In other embodiments, when there are a plurality of through vias to be formed, a quantity of the first portions 122a-1 and 122a-2 to 122a-n and a quantity of the second portions 122b-1 and 122b-2 to 122b-n are respectively equal to the quantity of the through vias to be formed. In some embodiments, after forming the pattern, the substrate 110, the insulating layer 130 and the conductive layer 120 are flipped over. In some embodiments, the second surface 112b is therefore referred to as a top surface or an exposed surface, but the disclosure is not limited thereto.

FIG. 7A is a cross-sectional view of a detector illustrating a stage of a method for forming the detector according to aspects of the present disclosure, and FIG. 7B is a top view of the detector in FIG. 7A. A funnel-shaped recess 140 is formed in the substrate 110. In some embodiments, the funnel-shaped recess 140 is formed by a suitable wet etching operation, but the disclosure is not limited thereto. As described above, the funnel-shaped recess 140 extends through the second surface 112b to the first surface 112a. As shown in FIGS. 7A and 7B, the funnel-shaped recess 140 has an upper opening 142a at the second surface 112b and a lower opening 142b at the first surface 112a. A width of the upper opening 142a is greater than a width of the lower opening 142b. Additionally, the insulating layer 130 is exposed through the lower opening 142b of the funnel-shaped recess 140.

Figure 8B:
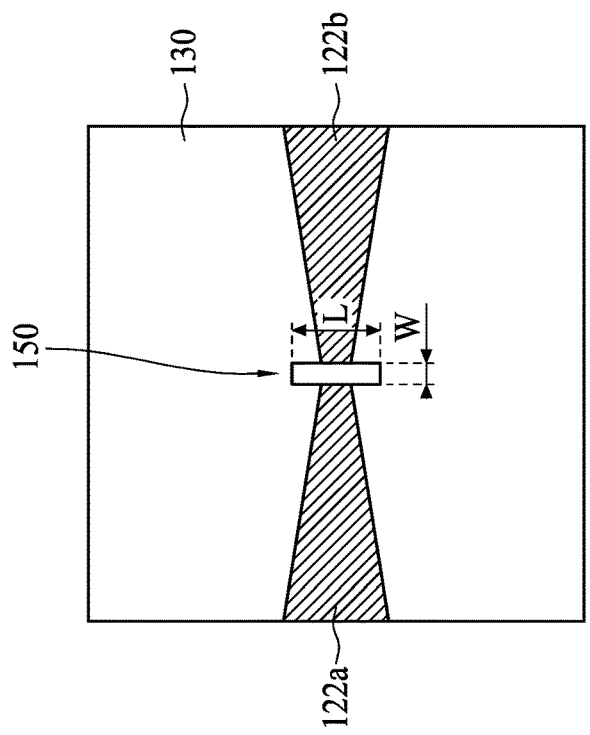
FIG. 8B is a bottom view or a top view of the detector in FIG. 8A.
Figure 8A:
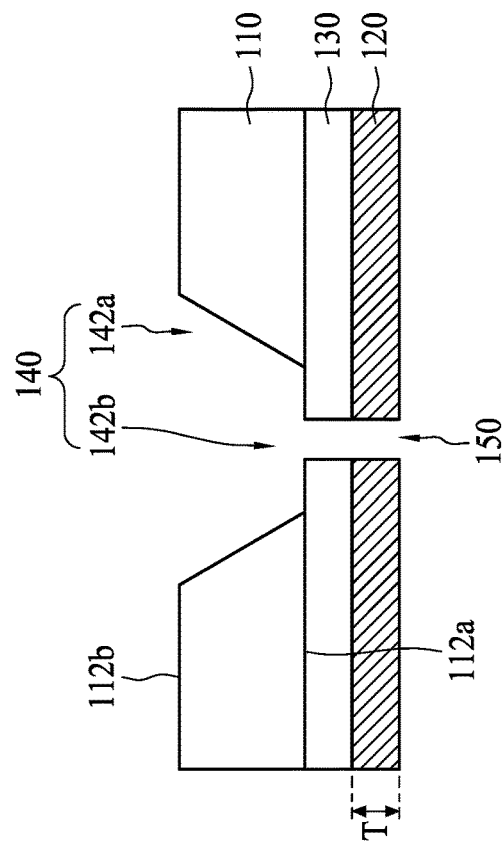
FIG. 8A is a cross-sectional view of a detection device illustrating a stage of a method for forming the detector according to aspects of the present disclosure.

FIG. 8A is a cross-sectional view of a detector illustrating a stage of a method for forming the detector according to aspects of the present disclosure, and FIG. 8B is a bottom view of the detector in FIG. 8A. In some embodiments, a through via 150 is formed in the insulating layer 130 and the conductive layer 120. As shown in FIG. 8A, the through via 150 extends through the conductive layer 120 and the insulating layer 130. The through via 150 can be formed by suitable dry etching operation, but the disclosure is not limited thereto. Further, the quantity of the through via 150 can be determined depending on different product require-ments. Therefore, in other embodiments, a plurality of through vias 150-1 and 150-2 to 150-n can be formed in the insulating layer 130 and the conductive layer 120. The through via 150 is coupled to the funnel-shaped recess 140. Further, the first portion 122a and the second portion 122b of the conductive layer 120 are separated from each other by the through via 150. In some embodiments, the through via 150 has a width W and a length L. The length L of the through via 150 is great enough to separate the first portion 122a and the second portion 122b, as shown in FIG. 8B. The width W of the through via 150 is less than the width of the lower opening 142b of the funnel-shaped recess 140. It should be noted that the length L of the through via 150 can be modified according to different detection purposes. For example, when the detector is to detect whether a chemical liquid is contaminated or not, the length L of the through via 150 is between approximately 100 μm and approximately 1000 μm, but the disclosure is not limited thereto. In other embodiments, when the detector is to detect particles in the chemical liquid, the length L of the through via 150 is between approximately 1 μm and approximately 10 μm, but the disclosure is not limited thereto.

It should be noted that the quantity of the through vias 150 can be modified depending on different product designs, the length L of each of the through vias 150 can be modified according to different detection purposes, and the thickness T of the conductive layer 120 is modified corresponding to the length L of the through via 150.

Figure 9:
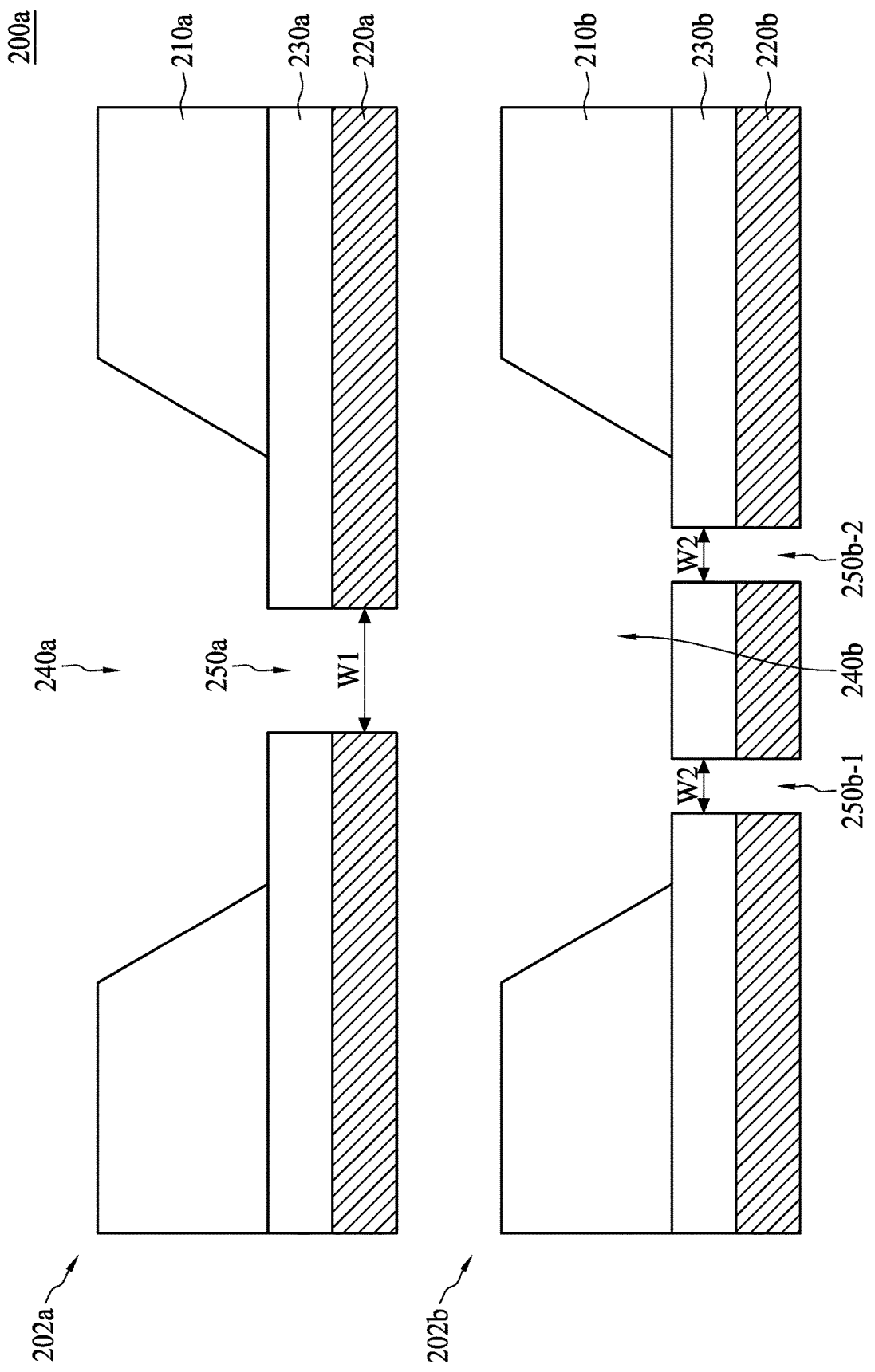
FIG. 9 is a cross-sectional view of a detection device according to aspects of the present disclosure.

FIG. 9 is a cross-sectional view of a detection device according to aspects of the present disclosure. It should be noted that same elements in the aforementioned drawings and FIG. 9 are indicated by the same numerals, and details of the same elements shown in aforementioned drawings and FIG. 9 are omitted in the description of FIG. 9 for brevity. In some embodiments, a detection device 200a is provided. The detection device 200a can include any combination of the aforementioned detector 100a, 100b, 100c, 100d and 100e, but is not limited thereto. In some embodiments, the detection device 200a includes a first detector 202a and a second detector 202b. In some embodiments, the first detector 202a and the second detector 202b are electrically connected in parallel, but the disclosure is not limited thereto. In some embodiments, the first detector 202a and the second detector 202b are physically separated from each other, as shown in FIG. 9, but the disclosure is not limited thereto.

The first detector 202a can include a substrate 210a, a conductive layer 220a and an insulating layer 230a between the substrate 210a and the conductive layer 220a, a recess 240a extending through the substrate 210a and a through via 250a extending through the conductive layer 220a and the insulating layer 230a. The conductive layer 220a can have a pattern including a first portion serving as a first electrode and a second portion serving as a second electrode. Though not shown, the first portion and the second portion of the pattern can have configurations similar to those described above, and therefore repeated description of such details is omitted. As mentioned above, the first portion and the second portion of the pattern are separated from each other by the through via 250a. The recess 240a can be a funnel-shaped recess as mentioned above, and includes an upper opening and a lower opening as mentioned above. The insulating layer 230a is exposed through the lower opening of the recess 240a. In some embodiments, the insulating layer 230a is exposed through a bottom of the recess 240a.

The through via 250a is coupled to the recess 240a, and a width W1 of the through via 250a is less than a width of the recess 240a.

The second detector 202b can include a substrate 210b, a conductive layer 220b and an insulating layer 230b between the substrate 210b and the conductive layer 220b, a recess 240b extending through the substrate 210b and a plurality of through vias 250b-1, 250b-2 extending through the conductive layer 220b and the insulating layer 230b. The conductive layer 220b can have a pattern including first portions serving as first electrodes and second portions serving as second electrodes. Though not shown, the first portions and the second portions of the pattern can have configurations similar to those shown above, and therefore repeated description of such details is omitted. As mentioned above, the first portions and the second portions of the pattern are separated from each other by the through vias 250b-1, 250b-2. The recess 240b can be a funnel-shaped recess as mentioned above, and includes an upper opening and a lower opening as mentioned above. The insulating layer 230b is exposed through the lower opening of the recess 240b. In some embodiments, the insulating layer 230b is exposed through a bottom of the recess 240b. The through via 250a is coupled to the recess 240a, and a width W2 of each of the through vias 250b-1, 250b-2 is less than a width of the recess 240b. Further, the width W2 of each through via 250b-1, 250b-2 is less than the width W1 of the through via 250a, as shown in FIG. 9.

Still referring to FIG. 9, a sum of the widths W2 of the through vias 250b-1, 250b-2 is equal to or greater than the width W1 of the through via 250a. It should be noted that in some embodiments, the recess 240a serves as a liquid inlet and the through vias 250b-1 and 250b-2 serve as a liquid outlet. The liquid enters the detection device 200a from the recess 240a and passes through the through via 250a and the recess 240b, and the liquid drained out through the through vias 250b-1 and 250b-2, if the sum of the widths W2 of the through vias 250b-1, 250b-2 is less than the width W1 of the through via 250a, the liquid may not drain out sufficiently quickly. Consequently, stagnation may be caused in the recess 240b, the through via 250a and the recess 240a. The detection device 200a therefore suffers failure.

Referring back to FIG. 9, in some embodiments, the substrates 210a and 210b can include the same material, but the disclosure is not limited thereto. In some embodiments, the insulating layer 230a and the insulating layer 230b can include the same insulating material, but the disclosure is not limited thereto. As mentioned above, the thicknesses of the insulating layers 230a and 230b are correlated to the length L of the through vias 250a and 250b-1, 250b-2. Consequently, the thickness of the insulating layer 230a, though which the bigger through via 250a extends, is greater than the thickness of the insulating layer 230b, though which the smaller through vias 250b-1 and 250b-2 extend. In some embodiments, the conductive layer 220a and the conductive layer 220b can include the same conductive material, but the disclosure is not limited thereto. In other embodiments, the conductive layer 220a and the conductive layer 220b can include different materials. For example, the conductive layer 220a can include a doped semiconductor material such as doped polysilicon while the conductive layer 220b includes metal.

Figure 10:
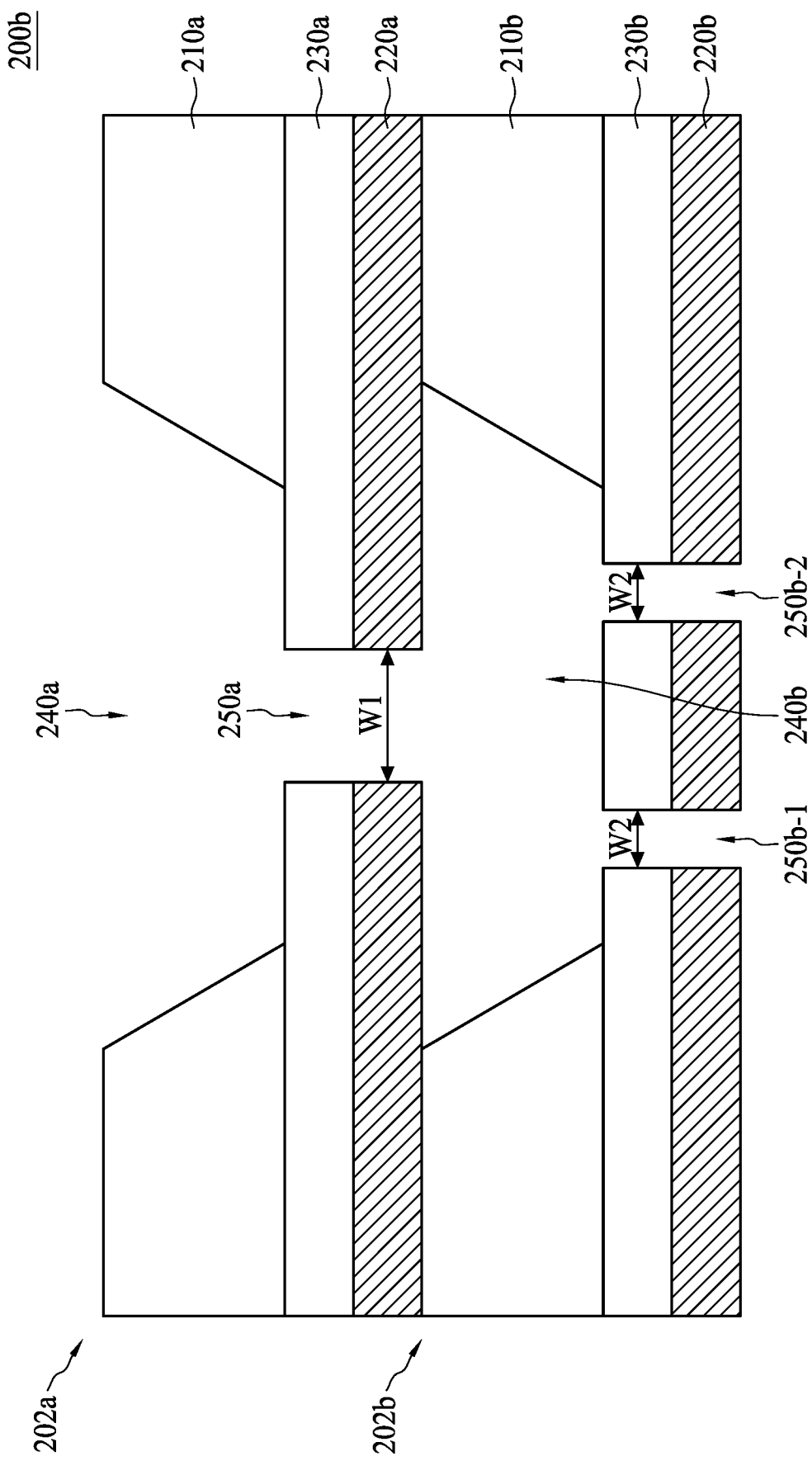
FIG. 10 is a cross-sectional view of a detection device according to aspects of the present disclosure.

FIG. 10 is a cross-sectional view of a detection device according to aspects of the present disclosure. It should be noted that same elements in FIGS. 9 and 10 are indicated by the same numerals, and details of the same elements shown in FIGS. 9 and 10 are omitted in the description of FIG. 10 for brevity. In some embodiments, a detection device 200b is provided. As mentioned above, the detection device 200b can include any combination of the aforementioned detector 100a, 100b, 100c, 100d and 100e, but is not limited thereto, in some embodiments, the detection device 200b includes a first detector 202a and a second detector 202b. In contrast to the first and second detectors 202a and 202b of the detection device 200a shown in FIG. 9, the first detector 202a and the second detector 202b of the detection device 200b are in contact with each other. In some embodiments, the conductive layer 220a of the first detector 202a is in contact with the substrate 210b of the second detector 202b, but the disclosure is not limited thereto.

Figure 11:
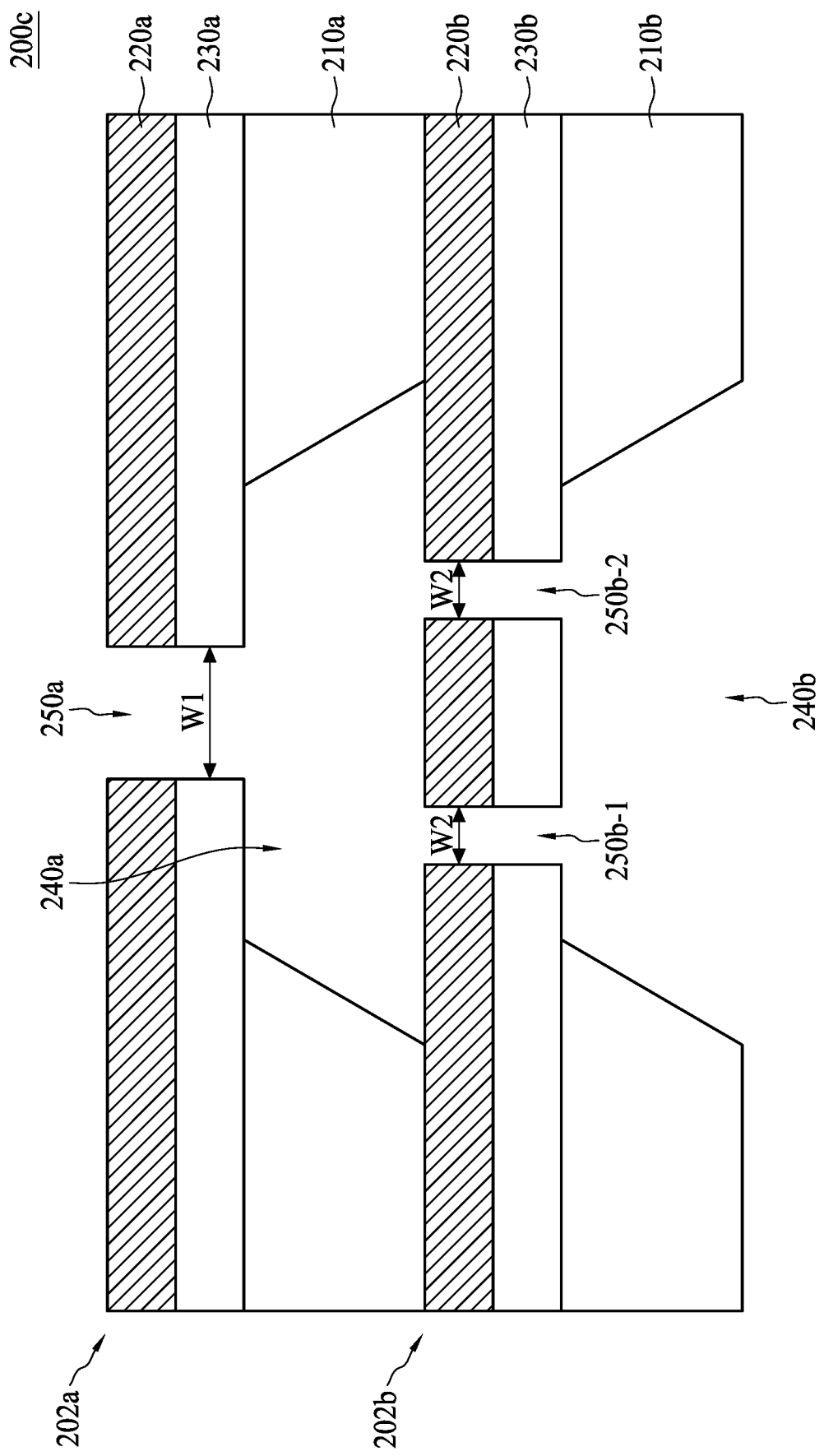
FIG. 11 is a cross-sectional view of a detection device according to aspects of the present disclosure.

FIG. 11 is a cross-sectional view of a detection device according to aspects of the present disclosure. It should be noted that same elements in FIGS. 9 and 11 are indicated by the same numerals, and details of the same elements shown in FIGS. 9 and 11 are omitted in the description of FIG. 11 for brevity. In some embodiments, a detection device 200c is provided. As mentioned above, the detection device 200c can include any combination of the aforementioned detectors 100a, 100b, 100c, 100d and 100e, but is not limited thereto. In some embodiments, the detection device 200c includes a first detector 202a and a second detector 202b. In contrast to the first and second detectors 202a and 202b of the detection device 200a shown in FIG. 9, the first detector 202a and the second detector 202b of the detection device 200c are in contact with each other. In some embodiments, the substrate 210a of the first detector 202a is in contact with the conductive layer 220b of the second detector 202b, but the disclosure is not limited thereto. In such embodiments, the through via 250a of the first detector 202a serves as a liquid inlet while the recess 240b of the second detector 202b serves as liquid outlet. It should be noted that because a sum of the widths W2 of the through vias 250b-1, 250b-2 is equal to or greater than the width W1 of the through via 250a, when the liquid enters the detection device 200c from the through via 250a and passes through the recess 240a and the through vias 250b-1, 250b-2, the liquid can drain out through the through vias 250b-1 and 250b-2. In some comparative approaches, if the sum of the widths W2 of the through vias 250b-1, 250b-2 is less than the width W1 of the through via 250a, the liquid may not drain out sufficiently quickly. Consequently, stagnation may be caused in the recess 240a and the through via 250a. The detection device 200c therefore suffers failure.

Figure 12:
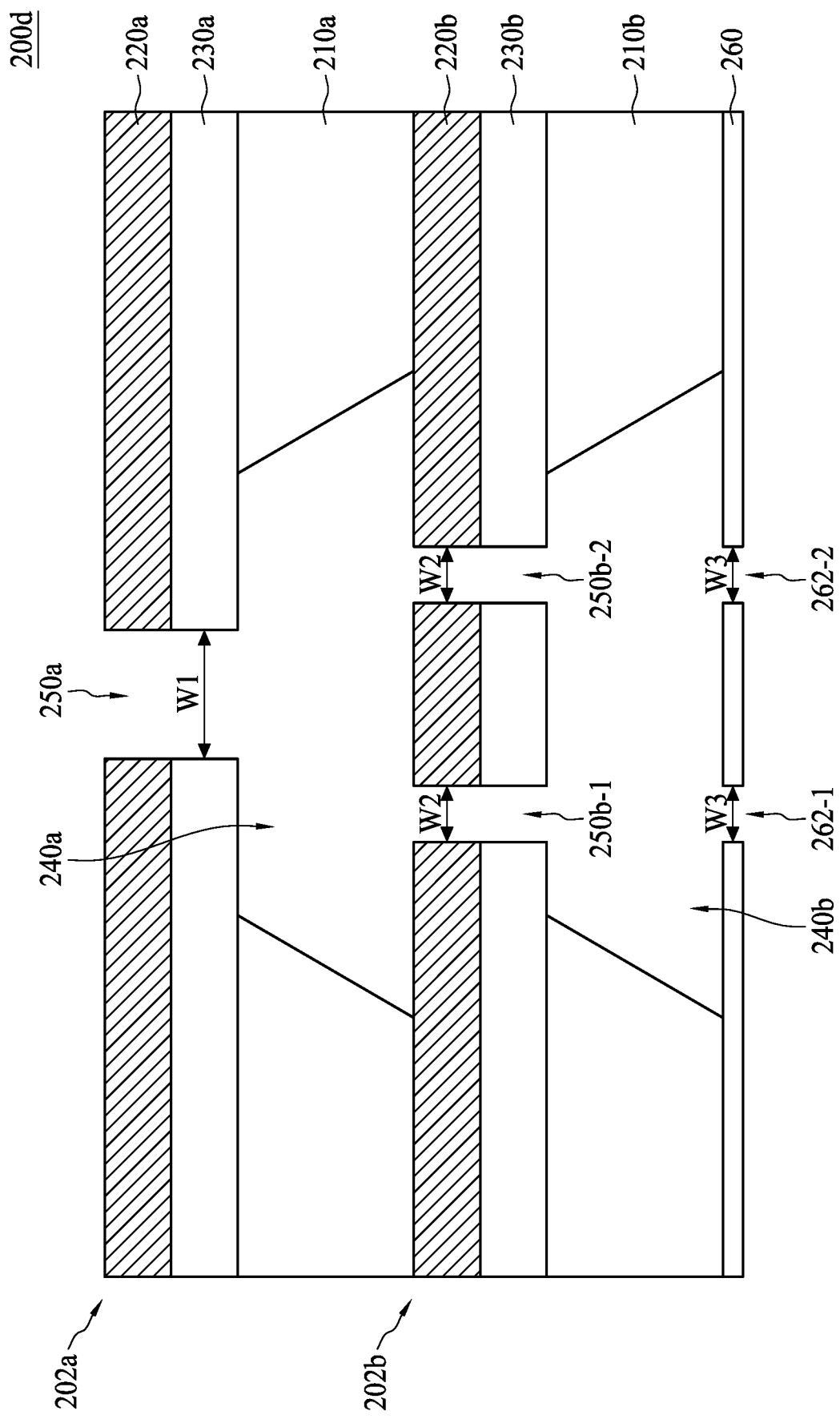
FIG. 12 is a cross-sectional view of a detection device according to aspects of the present disclosure.

FIG. 12 is a cross-sectional view of a detection device according to aspects of the present disclosure. It should be noted that same elements in FIGS. 11 and 12 are indicated by the same numerals, and details of the same elements shown in FIGS. 11 and 12 are omitted in the description of FIG. 12 for brevity. In some embodiments, a detection device 200d is provided. As mentioned above, the detection device 200d can include any combination of the aforementioned detector 100a, 100b, 100c, 100d and 100e, but is not limited thereto. In some embodiments, the detection device 200d includes a first detector 202a and a second detector 202b. In contrast to the detection device 200c shown in FIG. 11, the detection device 200d further includes a layer 260. The layer 260 serves as a sealing layer or a packaging material for supporting and integrating the detectors 202a and 202b. In some embodiments, the layer 260 can include a print circuit board (PCB). In other embodiments, the layer 260 can include plastic materials such as perfluoroalkoxy alkanes (PFA) or Polytetrafluoroethene (PTFE). In some embodiments, the substrate 210b is disposed between the insulating layer 230b and the dielectric layer 260. In some embodiments, the dielectric layer 260 includes a plurality of holes 262-1 and 262-2 to 262-n. It should be noted that a quantity of the holes 262-1 and 262-2 to 262-n is equal to the quantity of the through vias 250b-1 and 250b-2 to 250b-n of the second detector 202b. For example, when there are two through vias 250-1 and 250b-2 in the second detector 202b, there are two holes 262-1 and 262-2 in the dielectric layer 260. The holes 262-1 and 262-2 are all coupled to the recess 240b. In some embodiments, each of the holes 262-1 and 262-2 is aligned with one of the through vias 250b-1 and 250b-2, but the disclosure is not limited thereto. In some embodiments, the holes 262-1 and 262-2 respectively include a length, a diameter or a width W3, and the width W3 of the holes 262-1 and 262-2 is equal to or greater than the width W2 of the through vias 250b-1 and 250b-2.

Still referring to FIG. 12, in such embodiments, the holes 262-1 and 262-2 serves as a liquid outlet. It should be noted that because the width W3 of the holes 262-1 and 262-2 is equal to or greater than the width W2 of the through vias 250-1 and 250b-2, a sum of the widths W3 of the holes 262-1 and 262-2 is equal to or greater than the width W1 of the through via 250a. Therefore, when the liquid enters the detection device 200d from the through via 250a and passes through the recess 240a, the through vias 250b-1, 250b-2 and the recess 240b, the liquid can drain out through the holes 262-1 and 262-2. Accordingly, liquid stagnation in the recess 240b, the through vias 250b-1, 250b-2, the recess 240a and the through via 250a can be mitigated.

Figure 13:
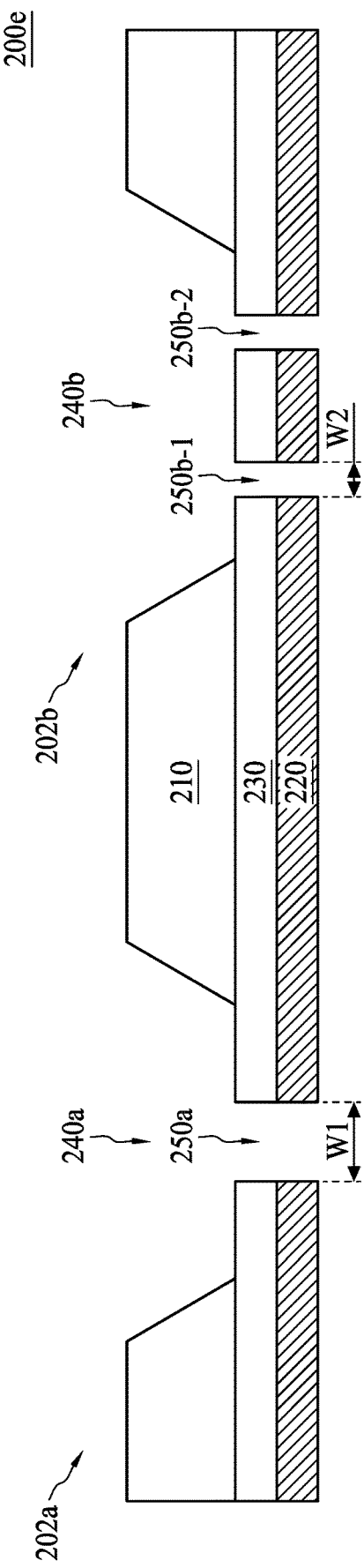
FIG. 13 is a cross-sectional view of a detection device according to aspects of the present disclosure.

FIG. 13 is a cross-sectional view of a detection device according to aspects of the present disclosure. It should be noted that same elements in FIGS. 9 and 13 are indicated by the same numerals, and details of the same elements shown in FIGS. 9 and 13 are omitted in the description of FIG. 13 for brevity. In some embodiments, a detection device 200e is provided. As mentioned above, the detection device 200e can include any combination of the aforementioned detectors 100a, 100, 100c, 100d and 100e, but not limited thereto. In some embodiments, the detection device 200e includes a first detector 202a and a second detector 202b. The first detector 202a includes a substrate, a conductive layer and an insulating layer between the substrate and the conductive layer, while the second detector 202b includes a substrate, a conductive layer and an insulating layer between the conductive layer and the substrate. In such embodiments, the substrate of the first detector 202a is in contact with the substrate of the second detector 202b to form a substrate 210, the conductive layer of the first detector 202a is in contact with the conductive layer of the second detector 202b to form a conductive layer 220, and the insulating layer of the first detector 202a is in contact with the insulating layer of the second detector 202b to form an insulating layer 230, as shown in FIG. 13. The first detector 202a includes a recess 240a extending through the substrate 210 and the second detector 202b includes a recess 240b extending through the substrate 210. The recess 240a and the recess 240b are separated from each other. The first detector 202a includes a through via 250a extending through the conductive layer 220 and the insulating layers 230, and the second detector 202b includes a plurality of through vias 250b extending through the conductive layer 220 and the insulating layers 230. The through vias 250a, 250b-1 and 250b-s are all separated from each other. The through via. 250a is coupled to the recess 240a, and the through vias 250b are coupled to the recess 240b. Further, a width W2 of the through vias 250b-1, 250b-2 is less than a width W1 of the through via 250a for different detection purposes. In such embodiments, both of the recess 240a of the first detector 202a and the recess 240b of the second detector 202b serve as liquid inlets, and all of the through vias 250a, 250b-1, 250b-2 of the first detector 202a and second detector 202b serve as liquid outlets.

Figure 14:
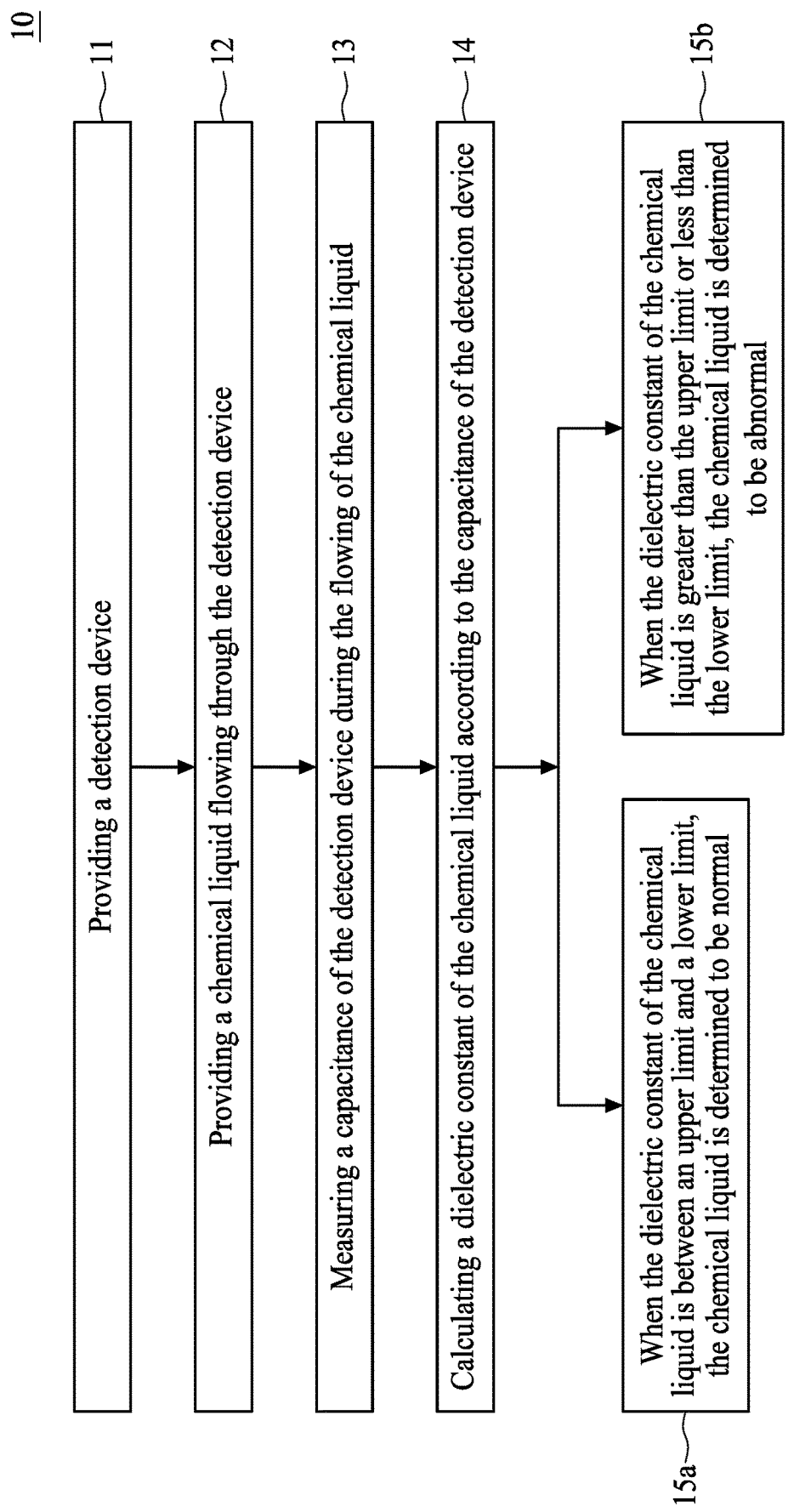
FIG. 14 is a flowchart representing a method for detecting particles in a chemical liquid according to aspects of the present disclosure.

FIG. 14 is a flowchart representing a method for detecting particles in a chemical liquid 10 according to aspects of the present disclosure. In some embodiments, the method 10 can be used to detect purity or characteristic of the chemical liquid. The method 10 includes a number of operations (11, 12, 13, 14, 15a, and 15b). The method 10 will be further described according to one or more embodiments. It should be noted that the operations of the method 10 may be rearranged or otherwise modified within the scope of the various aspects. It should be further noted that additional processes may be provided before, during, and after the method 10, and that some other processes may be only briefly described herein. Thus, other implementations are possible within the scope of the various aspects described herein.

The method for detecting particles in a chemical liquid 10 can be performed with the above-mentioned detection device 200a, 200b, 200c, 200d or 200e, but is not limited thereto. Further, the method for detecting particles in a chemical liquid 10 can be performed by the first detector 202a in any combination in the detection device 200a, 200b, 200c, 200d or 200e.

Figure 15:
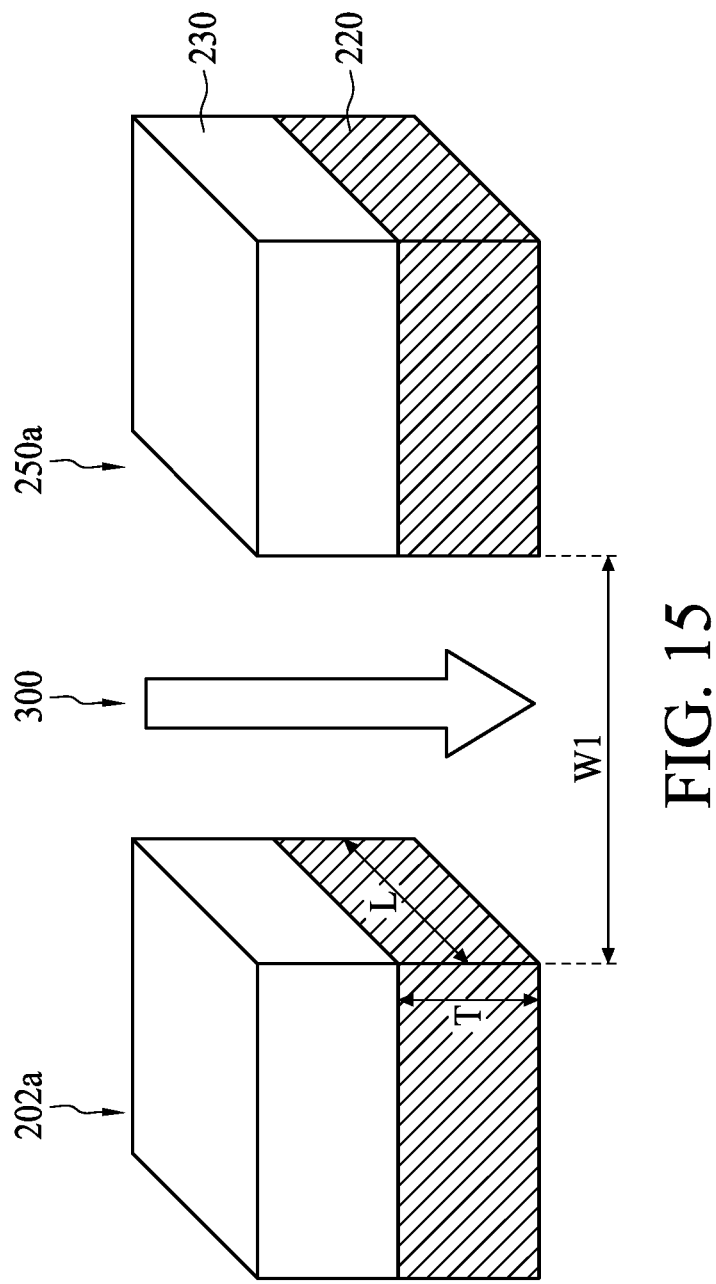
FIG. 15 is a schematic drawing illustrating a portion of the detection device in some embodiments of the method for detecting particles in a chemical liquid according to aspects of the present disclosure.
Figure 16A:
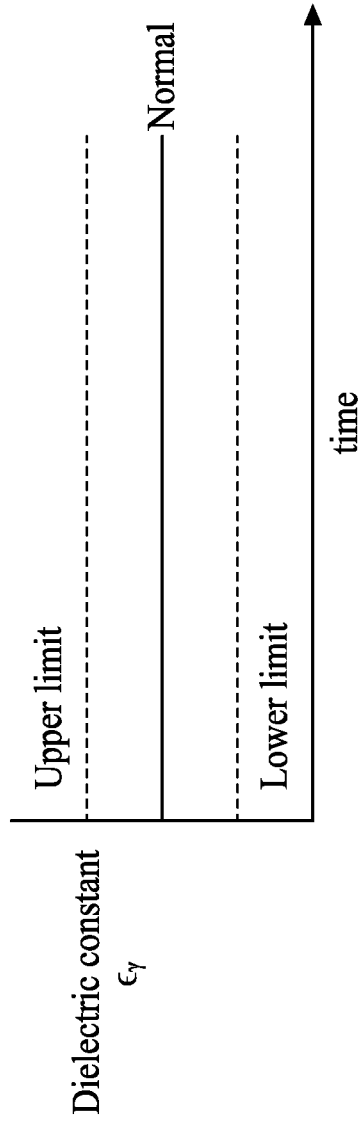
FIGS. 16A and 16B are diagrams illustrating detection results according to aspects of the present disclosure.
Figure 16B:
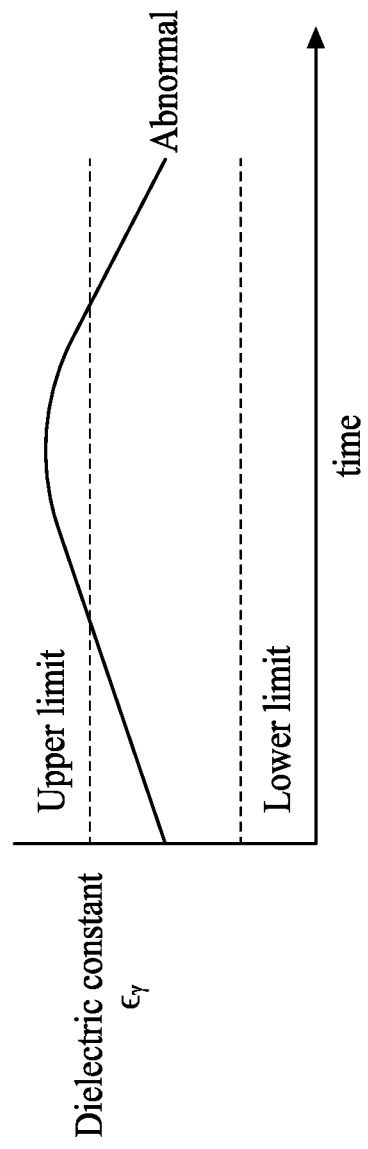

FIG. 15 is a schematic drawing illustrating a portion of the detection device in some embodiments of the method for detecting particles in a chemical liquid according to aspects of the present disclosure, and FIGS. 16A and 16B are diagrams illustrating detection results according to aspects of the present disclosure. At operation 11, a detection device is provided. In some embodiments, the detection device include a detector such as the first detector 202a, wherein the first detector 202a has a through via 250a with a length L between approximately 100 µm and approximately 1000 µm.

At operation 12, a chemical liquid 300 is provided to flow through the detection device, i.e., the first detector 202a. As shown in FIG. 15, the chemical liquid 300 flows through the through via 250a.

At operation 13, a capacitance of the detection device is measured during the flowing of the chemical liquid. It should be noted that in the first detector 202a, the conductive layer 220 has the pattern having a first portion and a second portion separated from each other by the through via 250a. With the chemical liquid 300 passing through the through via 250a, the conductive layer 220 having the pattern works as a capacitor with the first portion as a first electrode, the second portion as a second electrode, and the chemical liquid 300 as a dielectric material therebetween. A capacitance can be obtained during the flowing of the chemical liquid 300 through the through via 250a. In some embodiments, the capacitor formed by the first electrode, the second electrode and the chemical liquid 300 has a capacitance equal to or greater than approximately 1 nanofarad (nF). In some embodiments, such capacitor is referred to as an nano-capacitor.

At operation 14, a dielectric constant of the chemical liquid 300 is calculated according to the capacitances of the detection device. It is understood that a capacitance of a capacitor is correlated to a dielectric constant of the dielectric material and the distance between the two electrodes. In some embodiments, because the distance between the two electrodes is fixed, the dielectric constant of the dielectric material serves as a main parameter of the capacitance. Accordingly, the dielectric constant of the chemical liquid 300 can be obtained during the flowing of the chemical liquid 300 through the detection device, i.e., the first detector 202a.

Referring to FIGS. 16A and 16B, in some embodiments, a diagram illustrating the detection result can be obtained. The abscissa of the diagram can be the time during which the chemical liquid passes through the through via 250a, and the ordinate can be the dielectric constant calculated according to the capacitance of the detection device. At operation 15a, when the dielectric constant of the chemical liquid is between an upper limit and a lower limit, as shown in FIG. 16A, the chemical liquid 300 is determined to be normal. In some embodiments, when the dielectric constant of the chemical liquid 300 is greater than the upper limit or less than the lower limit, as shown in FIG. 16B, the chemical liquid is determined to be abnormal.

It should be noted that, by observing the dielectric constant of the chemical liquid 300, it is easy to determine a characteristic of the chemical liquid 300. For example, when the dielectric constant of the chemical liquid 300 is between the upper limit and the lower limit, as shown in FIG. 16A, it can be concluded that the chemical liquid has been produced, stored or transported without contamination or with low contamination, and the characteristic of the chemical liquid remains unaffected. When the dielectric constant of the chemical liquid 300 is greater than the upper limit or less than the lower limit, as shown in FIG. 16B, it can be concluded that particles or contamination are in the chemical liquid 300, and such particles or contamination has altered the characteristic of the chemical liquid 300 and thus the dielectric constant of the chemical liquid 300 is changed.

Figure 17:
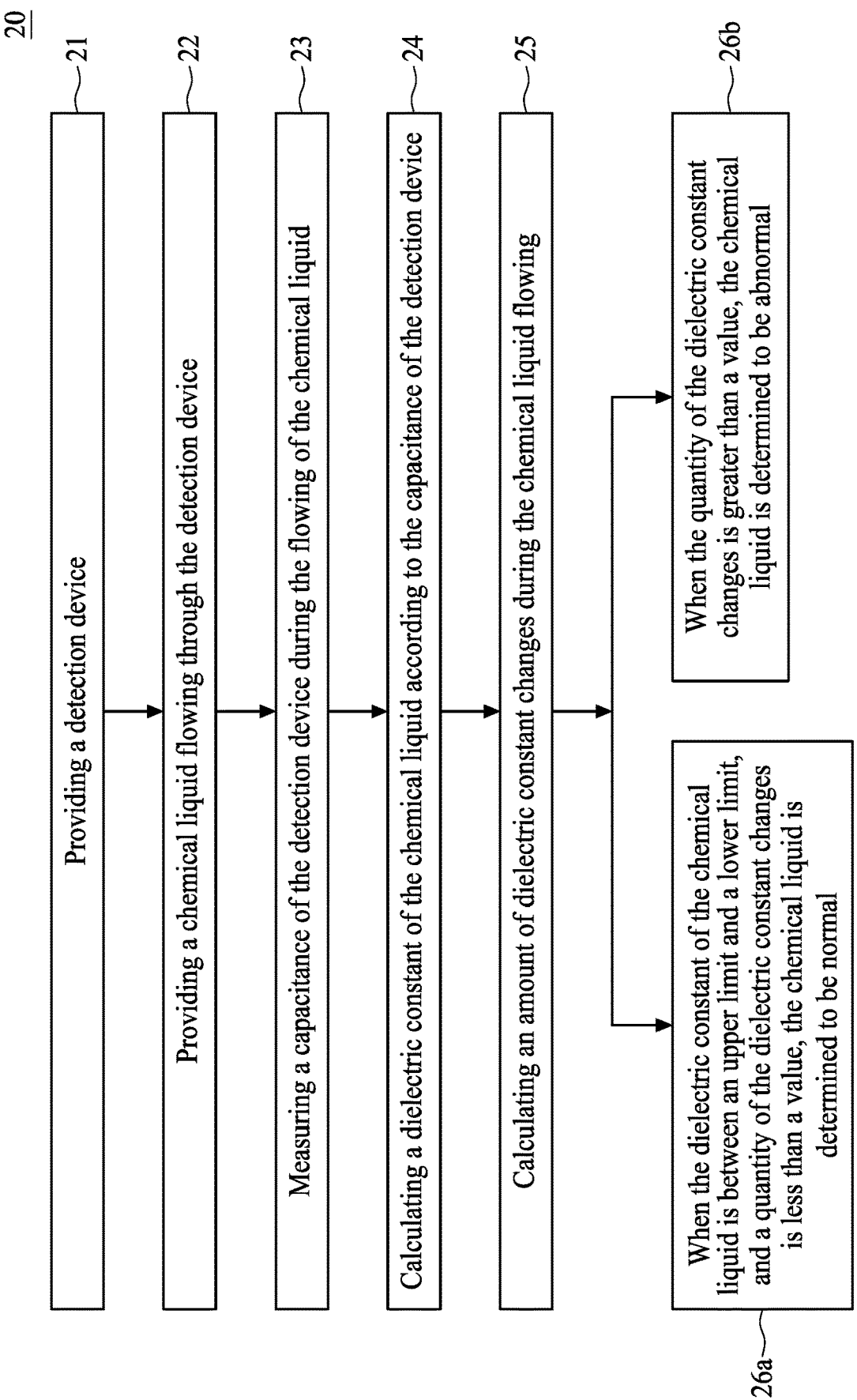
FIG. 17 is a flowchart representing a method for detecting particles in a chemical liquid according to aspects of the present disclosure.

FIG. 17 is a flowchart representing a method for detecting particles in a chemical liquid 20 according to aspects of the present disclosure. In some embodiments, the method 20 can be used to detect purity or characteristic of the chemical liquid. The method 20 includes a number of operations (21, 22, 23, 24, 25, 26a and 26b). The method 20 will be further described according to one or more embodiments. It should be noted that the operations of the method 20 may be rearranged or otherwise modified within the scope of the various aspects. It should be further noted that additional processes may be provided before, during, and after the method 20, and that some other processes may be only briefly described herein. Thus, other implementations are possible within the scope of the various aspects described herein.

The method for detecting particles in a chemical liquid 20 can be performed with the above-mentioned detection device 200a, 200b, 200c, 200d or 200e, but is not limited thereto. Further, the method for detecting particles in a chemical liquid 20 can be performed by the second detector 202b in any combination in the detection device 200a, 200b, 200c, 200d or 200e.

Figure 19A:
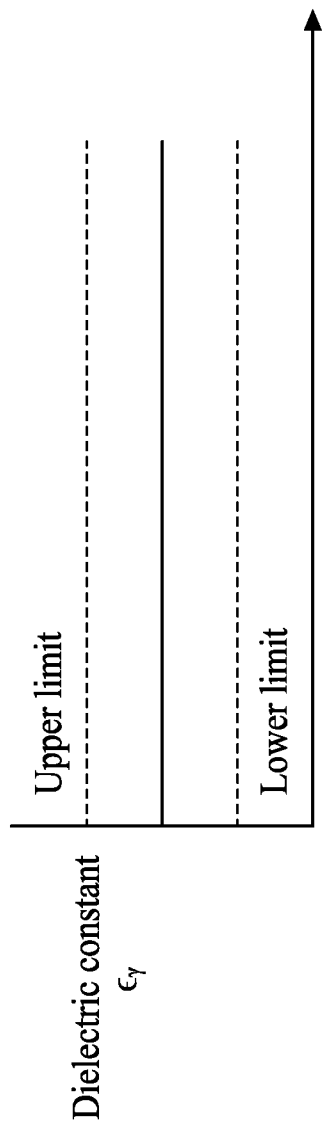
FIGS. 19A and 19B are diagrams illustrating detection results according to aspects of the present disclosure.
Figure 19B:
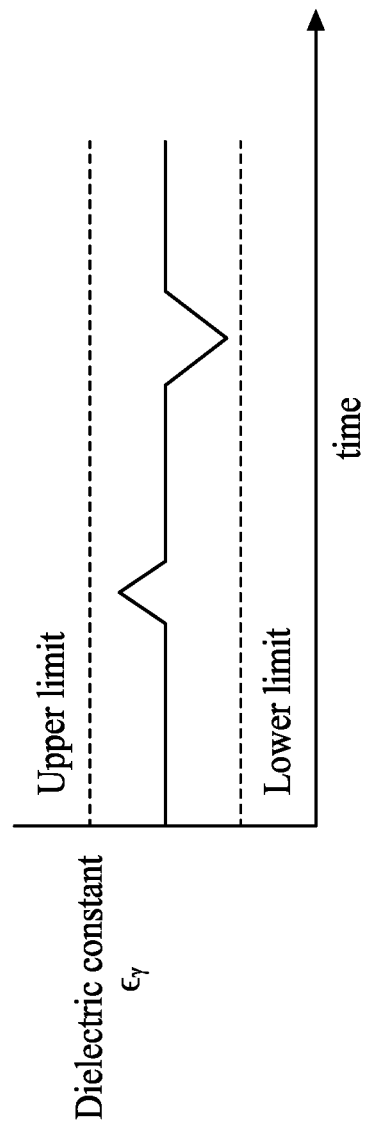

FIG. 18 is a schematic drawing illustrating a portion of the detection device in some embodiments of the method for detecting particles in a chemical liquid according to aspects of the present disclosure, and FIGS. 19A and 19B are diagrams illustrating detection results according to aspects of the present disclosure. At operation 21, a detection device is provided. In some embodiment, the detection device includes a detector such as the second detector 202b, wherein the second detector 202b has a through via 250b with a length L between approximately 1 μm and approximately 10 μm.

At operation 22, a chemical liquid 300 is provided to flow through the detection device. As shown in FIG. 18, the chemical liquid 300 flows through the through via 250b.

At operation 23, a capacitance of the detection device is measured during the flowing of the chemical liquid. It should be noted that in the second detector 202b, the conductive layer 220 has a pattern having a first portion and a second portion separated from each other by the through via 250b. With the chemical liquid 300 passing through the through via 250b, the conductive layer 220 having the pattern works as a capacitor with the first portion as a first electrode, the second portion as a second electrode, and the chemical liquid 300 as a dielectric material therebetween. A capacitance can be obtained during the flowing of the chemical liquid through the through via 250b-1. In some embodiments, the capacitor formed by the first electrode, the second electrode and the chemical liquid 300 has a capacitance less than or equal to approximately 0.01 picofarad (pF). In some embodiments, such capacitor is referred to as a nano-capacitor.

At operation 24, a dielectric constant of the chemical liquid 300 is calculated according to the capacitance of the detection device. As mentioned above, a capacitance of a capacitor is correlated to a dielectric constant of the dielectric material and the distance between the two electrodes. In some embodiments, because the distance between the two electrodes is fixed, the dielectric constant of the dielectric material serves as a main parameter of the capacitance. Accordingly, the dielectric constant of the chemical liquid 300 can be obtained during the flowing of the chemical liquid 300 through the detection device, i.e., the second detector 202b.

At operation 25, in some embodiments, the dielectric constant of the chemical liquid 300 may change during the flowing of the chemical liquid 300 through the detection device. In such embodiments, such dielectric constant changes are calculated and recorded.

Referring to FIGS. 19A and 19B, in some embodiments, a diagram illustrating the detection result can be obtained. The abscissa of the diagram can be the time during which the chemical liquid passes through the through via 250b and the ordinate can be the dielectric constants calculated according to the capacitances of the detection device. At operation 26a, when the dielectric constant of the chemical liquid is between an upper limit and a lower limit, as shown in FIG. 18A, the chemical liquid 300 is determined to be normal. Further, at operation 26a, when a quantity of the dielectric constant changes is less than a value, the chemical liquid 300 is determined to be normal. In some embodiments, when the quantity of the dielectric constant changes is greater than the value, as shown in FIG. 19B, the chemical liquid 300 is determined to be abnormal.

Because the particles may alter the characteristic of the chemical liquid 300 and change the dielectric constant of the chemical liquid 300, it is easy to determine whether there are particles in the chemical liquid 300 by observing the dielectric constant of the chemical liquid 300. In some embodiments, when the dielectric constant of the chemical liquid 300 is between the upper limit and the lower limit, as shown in FIG. 19A, it can be concluded that the chemical liquid 300 has been produced, stored or transported without particles or with few particles. In other embodiments, when the dielectric constant of the chemical liquid 300 is greater than the upper limit or less than the lower limit, it can be concluded that particles or contamination are in the chemical liquid 300, and such particles have altered the characteristic of the chemical liquid 300 and thus the dielectric constant of the chemical liquid 300 is changed.

In some embodiments, when the particles are nanoparticles, such particles may not be sufficient to alter the dielectric constant of the chemical liquid 300 beyond the upper or lower limits, but does cause dielectric constant to change. In such embodiments, the dielectric constant changes are recorded, as shown in FIG. 19B. In some embodiments, when the quantity of the dielectric constant changes is less than a value, it is concluded that an quantity of the nano-particles in the chemical liquid 300 is not sufficient to cause an unstable dielectric constant, and the chemical liquid 300 can be determined to be normal. In some embodiments, when the quantity of the dielectric constant changes is greater than a value, it is concluded that an amount of the nano-particles in the chemical liquid 300 is sufficient to cause the unstable dielectric constant, and the chemical liquid 300 can be determined to be abnormal.

It will be appreciated that in the foregoing methods 10 and 20, the chemical liquid to be tested can be a liquid having a dielectric constant less than 100, but the disclosure is not limited thereto. In some embodiments, the chemical liquid to be tested can be a liquid having a dielectric constant less than 80, but the disclosure is not limited thereto.

It will be appreciated that in the forgoing methods, the detection device can include the first detector 202a and the second detector 202b such that when the chemical liquid 300 flows into the detection device, the chemical liquid 300 passes through the bigger through via 250a and the smaller through vias 250b. Accordingly, characteristics and potential dielectric constant changes are both obtained. Accordingly, the contamination caused by particles or nano-particles can be easily detected at early stage.

According to one embodiment of the present disclosure, a method for detecting particles in a liquid is provided. The method includes following operations. A detection device is provided. A chemical liquid is provided to flow through the detection device. A capacitance of the detection device is measured during the flowing of the chemical liquid. A dielectric constant of the chemical liquid is calculated according to the capacitance of the detection device. When the dielectric constant of the chemical liquid is between an upper limit and a lower limit, the chemical liquid is determined to be normal.

According to one embodiment of the present disclosure, a method for detecting particles in a liquid is provided. The method includes following operations. A detection device is provided. The detection device includes at least a detector. The detector includes a substrate, a funnel-shaped recess, a conductive layer, an insulating layer, and a first through via. The substrate includes a first surface and a second surface opposite to the first surface. The funnel-shaped recess extending from the second surface to the first surface of the substrate. The conductive layer is disposed below the first surface of the substrate. The insulating layer is disposed between the substrate and the conductive layer. The first through via extends through the conductive layer and the insulating layer, and coupled to the funnel-shaped recess. A chemical liquid is provided to flow through the detection device. A capacitance of the detection device is measured during the flowing of the chemical liquid. A dielectric constant of the chemical liquid is calculated according to the capacitance of the detection device, when the dielectric constant of the chemical liquid is between an upper limit and a lower limit, the chemical liquid is determined to be normal. When the dielectric constant of the chemical liquid is greater than the upper limit or less than the lower limit, the chemical liquid is determined to be abnormal.

According to one embodiment of the present disclosure, a method for detecting particles in a liquid is provided. The method includes following operations. A detection device is provided. The detection device includes a first detector and a second detector. The first detector and the second detector are coupled to each other. A chemical liquid is provided to flow through the detection device. A capacitance of the detection device is measured during the flowing of the chemical liquid. A dielectric constant of the chemical liquid is calculated according to the capacitance of the detection device. When the dielectric constant of the chemical liquid is between an upper limit and a lower limit, the chemical liquid is determined to be normal. When the dielectric constant of the chemical liquid is greater than the upper limit or less than the lower limit, the chemical liquid is determined to be abnormal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for detecting particles in a liquid, comprising:
    providing a detection device, wherein the detection device comprises at least a detector, and the at least detector comprises:
        a substrate comprising a recess;
        a first conductive layer and a second conductive layer separated from each other;
        an insulating layer disposed between the substrate and the first conductive layer, and between the substrate and the second conductive layer;
        a first through via extending through the first conductive layer and the insulating layer, and coupled to the recess; and
        a second through via extending through the second conductive layer and the insulating layer, wherein the second through via is coupled to the recess, and separated from the first through via;
    providing a chemical liquid flowing through the detection device;
    measuring a capacitance of the detection device during the flowing of the chemical liquid;
    calculating a dielectric constant of the chemical liquid according to the capacitance of the detection device; and
    when the dielectric constant of the chemical liquid is between a predetermined upper limit and a predetermined lower limit, the chemical liquid is determined to be normal.

2. The method of claim 1, further comprising when the dielectric constant of the chemical liquid is greater than the upper limit or less than the lower limit, the chemical liquid is determined to be abnormal.

3. The method of claim 1, further comprising:
    calculating a quantity of dielectric constant changes during the flowing of the chemical liquid; and
    when the quantity of the dielectric constant changes is greater than a predetermined value, the chemical liquid is determined to be abnormal.

4. A method for detecting particles, comprising:
providing a detection device, wherein the detection device comprises at least a detector, and the detector comprises:
- a substrate comprising a first surface and a second surface opposite to the first surface;
- a funnel-shaped recess extending from the second surface of the substrate to the first surface of the substrate;
- a conductive layer disposed below the first surface of the substrate;
- an insulating layer disposed between the substrate and the conductive layer; and
- a first through via extending through the conductive layer and the insulating layer, and coupled to the funnel-shaped recess;

providing a chemical liquid flowing through the detection device;
measuring a capacitance of the detection device during the flowing of the chemical liquid;
calculating a dielectric constant of the chemical liquid according to the capacitance of the detection device;
when the dielectric constant of the chemical liquid is between an upper limit and a lower limit, the chemical liquid is determined to be normal; and
when the dielectric constant of the chemical liquid is greater than the upper limit or less than the lower limit, the chemical liquid is determined to be abnormal.

5. The method of claim 4, further comprising:
calculating a quantity of dielectric constant changes during the flowing of the chemical liquid; and
when the quantity of the dielectric constant changes is greater than a predetermined value, the chemical liquid is determined to be abnormal.

6. The method of claim 4, wherein the conductive layer comprises a metal layer or a doped semiconductor layer.

7. The method of claim 4, wherein the conductive layer has a pattern, and the insulating layer is exposed through the pattern.

8. The method of claim 7, wherein the pattern of the conductive layer comprises a first portion and a second portion, and the first portion and the second portion are separated from each other by the first through via.

9. The method of claim 4, wherein the funnel-shaped recess has an upper opening in the second surface and a lower opening in the first surface, and a width of the upper opening is greater than a width of the lower opening.

10. The method of claim 9, wherein the first through via has a width, and the width of the first through via is less than the width of the lower opening of the funnel-shaped recess.

11. The method of claim 9, further comprising a second through via extending through the conductive layer and the insulating layer, wherein the second through via is separated from the first through via and coupled to the funnel-shaped recess, a width of the first through via and a width of the second through via are less than the width of the lower opening of the funnel-shaped recess.

12. A method for detecting particles, comprising:
providing a detection device, wherein the detection device comprises a first detector and a second detector, and the first detector and the second detector are coupled to each other, wherein the first detector comprises:
- a first substrate having a first recess;
- a first conductive layer;
- a first insulating layer disposed between the first substrate and the first conductive layer, wherein a portion of the first insulating layer is exposed through a bottom of the first recess; and
- a first through via extending through the first conductive layer and the first insulating layer, and coupled to the first recess; and the second detector comprises:
- a second substrate having a second recess;
- a second conductive layer;
- a second insulating layer disposed between the second substrate and the second conductive layer, wherein a portion of the second insulating layer is exposed through a bottom of the second recess; and
- a plurality of second through vias extending through the second conductive layer and the second insulating layer, and coupled to the second recess,
wherein the first through via has a first width, each of the second through vias has a second width, and the second width is less than the first width;

providing a chemical liquid flowing through the detection device;
measuring a capacitance of the detection device during the flowing of the chemical liquid;
calculating a dielectric constant of the chemical liquid according to the capacitance of the detection device;
when the dielectric constant of the chemical liquid is between an upper limit and a lower limit, the chemical liquid is determined to be normal; and
when the dielectric constant of the chemical liquid is greater than the upper limit or less than the lower limit, the chemical liquid is determined to be abnormal.

13. The method of claim 12, further comprising:
calculating a quantity of dielectric constant changes during the flowing of the chemical liquid; and
when the quantity of the dielectric constant changes is greater than a predetermined value, the chemical liquid is determined to be abnormal.

14. The method of claim 12, wherein the first conductive layer is in contact with the second substrate.

15. The method of claim 12, wherein the first substrate is in contact with the second substrate, the first conductive layer is in contact with the second conductive layer, and the first insulating layer is in contact with the second insulating layer.

16. The method of claim 12, wherein the first conductive layer and the second conductive layer comprise different materials.

17. The method of claim 12, wherein further comprising a dielectric layer disposed below the second substrate, wherein the dielectric layer comprise a plurality of holes, and each of the plurality of holes has a third width equal to or greater than the second widths of the plurality of second through vias.

18. The method of claim 1, wherein each of the first conductive layer and the second conductive layer comprises a metal layer or a doped semiconductor layer.

19. The method of claim 1, wherein the first conductive layer comprises a first portion and a second portion separated from each other by the first through via, and the second conductive layer comprises a third portion and a fourth portion separated from each other by the second through via.

20. The method of claim 1, wherein a width of the first through via and a width of the second through via are less than a width of a lower opening of the recess.

* * * * *